United States Patent
Xu et al.

(10) Patent No.: US 12,407,477 B2
(45) Date of Patent: Sep. 2, 2025

(54) DECODING OF PHYSICAL DOWNLINK CONTROL CHANNELS ENDING AT SAME SYMBOL OR DIFFERENT SYMBOLS

(71) Applicant: QUALCOMM Incorporated, San Diego, CA (US)

(72) Inventors: Huilin Xu, Temecula, CA (US); Jing Lei, San Diego, CA (US); Chao Wei, Beijing (CN); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/907,088

(22) PCT Filed: Sep. 30, 2020

(86) PCT No.: PCT/CN2020/119435
§ 371 (c)(1),
(2) Date: Sep. 22, 2022

(87) PCT Pub. No.: WO2021/223362
PCT Pub. Date: Nov. 11, 2021

(65) Prior Publication Data
US 2024/0223335 A1 Jul. 4, 2024

(30) Foreign Application Priority Data
May 8, 2020 (WO) ................ PCT/CN2020/089165

(51) Int. Cl.
*H04L 5/00* (2006.01)
*H04L 1/1867* (2023.01)
*H04W 72/232* (2023.01)

(52) U.S. Cl.
CPC ......... *H04L 5/0053* (2013.01); *H04W 72/232* (2023.01)

(58) Field of Classification Search
CPC ... H04L 5/0053; H04L 1/1896; H04W 72/232
See application file for complete search history.

(56) References Cited

U.S. PATENT DOCUMENTS

| | | |
|---|---|---|
| 2017/0230994 A1 | 8/2017 | You et al. |
| 2018/0338307 A1 | 11/2018 | Feng |

(Continued)

FOREIGN PATENT DOCUMENTS

| | | |
|---|---|---|
| CN | 104737479 A | 6/2015 |
| CN | 110268778 A | 9/2019 |

(Continued)

OTHER PUBLICATIONS

3GPP TSG RAN WG1 Meeting#88, R1-1701588 Title: PDCCH procedure and DCI carried by PDSCH region (Year: 2017).*

(Continued)

*Primary Examiner* — Faruk Hamza
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a base station may determine that a distance between an end of a first downlink control information (DCI) and a corresponding first physical downlink shared channel (PDSCH) and a distance between an end of a second DCI and a corresponding second PDSCH satisfy a minimum distance threshold for a user equipment (UE). The ends of the DCIs are to be received at the same symbol. The base station may transmit the first DCI, the first PDSCH, the second DCI, and the second PDSCH based at least in part on determining that the distances satisfy the minimum distance threshold. In some aspects, the UE may decode the first and second DCIs in an order that depends on DCI properties. Numerous other aspects are provided.

30 Claims, 16 Drawing Sheets

(56) References Cited

U.S. PATENT DOCUMENTS

| | | | |
|---|---|---|---|
| 2019/0020506 | A1 | 1/2019 | Cheng et al. |
| 2019/0104543 | A1* | 4/2019 | Park ................... H04W 74/006 |
| 2019/0141733 | A1 | 5/2019 | Kim et al. |
| 2020/0022078 | A1 | 1/2020 | Papasakellariou |
| 2020/0029315 | A1* | 1/2020 | Lin .................... H04W 52/0216 |
| 2020/0092685 | A1* | 3/2020 | Fehrenbach .......... H04W 36/08 |
| 2020/0092818 | A1* | 3/2020 | Jiang ................. H04W 52/0261 |
| 2020/0204312 | A1* | 6/2020 | Xu ...................... H04W 36/085 |
| 2020/0221428 | A1* | 7/2020 | Moon .................. H04L 1/0046 |

FOREIGN PATENT DOCUMENTS

| | | |
|---|---|---|
| CN | 111082912 A | 4/2020 |
| CN | 111107632 A | 5/2020 |
| WO | WO-2020032587 A1 | 2/2020 |

OTHER PUBLICATIONS

CATT: "Discussion On Cross-carrier Scheduling with Different Numerologies", 3GPP TSG RAN WG1 Meeting #96bis, R1-1904545, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019, 7 Pages, XP051699771, figures 1, sections 1, 4, 5, 2.1, 2.2.

CATT: "Discussion on Cross-Carrier Scheduling with Different Numerologies", 3GPP TSG RAN WG1 Meeting #96bis, R1-1904545, Xi'an, China, Apr. 8-12, 2019, 7 Pages.

Lenovo, et al., "Discussion of Multi-panel/multi-TRP Transmission", 3GPP TSG RAN WG1 Meeting #95, R1-1812784, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 5 Pages, XP051554742, figure 1, section 2.2.

Lenovo, et al., "Discussion of Multi-TRP/panel Transmission", 3GPP TSG RAN WG1 Meeting #99, R1-1912316, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, 11 Pages, XP051819990, figure 1, sections 2.1.3, 2.1.4, 2.1.6, 3.2.

Nokia Networks, et al., "Timing Relationships for NB-IoT", 3GPP TSG-RAN WG1 NB-IoT Ad-Hoc Meeting, R1-161856, 3rd Generation Partnership Project, Mobile Competence Centre, 650, Route Des Lucioles, F-06921 Sophia-Antipolis Cedex, France, vol. RAN WG1, No. Sophia Antipolis, France, Mar. 22, 2016-Mar. 24, 2016, Feb. 5, 2020, 5 Pages, XP051846476, figure 1, section 2.

Supplementary Partial European Search Report—EP20934584—Search Authority—The Hague—May 21, 2024.

International Search Report and Written Opinion—PCT/CN2020/089165—ISA/EPO—Jan. 27, 2021.

International Search Report and Written Opinion—PCT/CN2020/119435—ISA/EPO—Feb. 7, 2021.

Sequans: "L1 Enhancements for URLLC", 3GPP TSG RAN WG1 Meeting #94bis, R1-1811461, Chengdu, China, Oct. 8-12, 2018, Sep. 28, 2018 (Sep. 28, 2018) Sections 1-2, 7 Pages, the Whole Document.

Intel Corporation: "Remaining Details on UE Processing Times and HARQ Operation", 3GPP TSG RAN WG1 Meeting #92, R1-1803265, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 26, 2018, pp. 1-12, XP051393505, figure 1, sections 2, 4.

Mediatek Inc: "Enhancements to eURLLC Scheduling/HARQ", 3GPP TSG RAN WG1 Meeting #99, R1-1912119, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 8 Pages, XP051823212, figures 2-4, sections 2.1, 2.2.

Nokia: "Introduction of Cross-Slot Scheduling Restriction", 3GPP TSG-RAN WG1 Meeting #99, RP-192642 (R1-1913660), 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Dec. 7, 2019, 10 Pages, XP051838485, sections 5.1.2.1, 5.2.1.5.1, 5.3, 5.3.1.

NTT Docomo Inc: "Enhancements to Scheduling/HARQ for URLLC", 3GPP TSG RAN WG1 #99, R1-1912888, 3rd Generation Partnership Project, Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 9, 2019, pp. 1-7, XP051823668, sections 2.1, 2.2.

Qualcomm Incorporated: "Remaining Issues on Cross-Carrier Scheduling with Different Numerologies", 3GPP TSG-RAN WG1 #98bis, R1-1911142, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, 9 Pages, XP051808865, sections 2.1-2.5.

Supplementary European Search Report—EP20934584—Search Authority—The Hague—Sep. 16, 2024.

* cited by examiner

DECODING OF PHYSICAL DOWNLINK CONTROL CHANNELS ENDING AT SAME SYMBOL OR DIFFERENT SYMBOLS

CROSS-REFERENCE TO RELATED APPLICATION

This application is a 371 national stage of PCT Application No. PCT/CN2020/119435 filed on Sep. 30, 2020, entitled "DECODING OF PHYSICAL DOWNLINK CONTROL CHANNELS ENDING AT SAME SYMBOL OR DIFFERENT SYMBOLS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for decoding physical downlink control channels that end at the same symbol or different symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining that a first distance between an end of a first downlink control information (DCI) to be received by a user equipment (UE) and a corresponding first physical downlink shared channel (PDSCH) to be received by the UE satisfies a minimum distance threshold, and determining that a second distance between an end of a second DCI to be received by the UE and a corresponding second PDSCH to be received by the UE satisfies the minimum distance threshold. The end of the first DCI and the end of the second DCI are to be received by the UE at a same symbol. The method may include transmitting the first DCI, the first PDSCH, the second DCI, and the second PDSCH based at least in part on the determining that the first distance satisfies the minimum distance threshold and that the second distance satisfies the minimum distance threshold.

In some aspects, a method of wireless communication, performed by a UE, may include determining that an end of a first DCI and an end of a second DCI are to be received from a base station at a same symbol, and decoding the first DCI and the second DCI in an order that is based at least in part on one or more properties of the first DCI, one or more properties of the second DCI, or a combination thereof. The method may include receiving a first PDSCH based at least in part on when the UE decodes the first DCI, and receiving a second PDSCH based at least in part on when the UE decodes the second DCI.

In some aspects, a method of wireless communication, performed by a base station, may include determining that an end of a first DCI and an end of a second DCI are to be received by a UE at a same symbol, and determining that the UE is to decode the first DCI and the second DCI in an order that is based at least in part on one or more properties of the first DCI, one or more properties of the second DCI, or a combination thereof. The method may include transmitting a first PDSCH based at least in part on when the UE is to decode the first DCI, and transmitting a second PDSCH based at least in part on when the UE is to decode the second DCI.

In some aspects, a base station for wireless communication may include memory and one or more processors coupled to the memory. For example, the one or more processors may be operatively, electronically, communicatively, or otherwise coupled to the memory. The memory may include instructions executable by the one or more processors to cause the base station to determine that a first distance between an end of a first DCI to be received by a UE and a corresponding first PDSCH to be received by the UE satisfies a minimum distance threshold, and determine that a second distance between an end of a second DCI to be received by the UE and a corresponding second PDSCH to be received by the UE satisfies the minimum distance threshold. The end of the first DCI and the end of the second DCI are to be received by the UE at a same symbol. The memory may include instructions executable by the one or more processors to cause the base station to transmit the first DCI, the first PDSCH, the second DCI, and the second PDSCH based at least in part on the determining that the first distance satisfies the minimum distance threshold and that the second distance satisfies the minimum distance threshold.

In some aspects, a UE for wireless communication may include memory and one or more processors coupled to the memory. For example, the one or more processors may be operatively, electronically, communicatively, or otherwise coupled to the memory. The memory may include instructions executable by the one or more processors to cause the UE to determine that an end of a first DCI and an end of a second DCI are to be received from a base station at a same symbol, and decode the first DCI and the second DCI in an order that is based at least in part on one or more properties of the first DCI, one or more properties of the second DCI, or a combination thereof. The memory may include instructions executable by the one or more processors to cause the UE to receive a first PDSCH based at least in part on when the UE decodes the first DCI, and receive a second PDSCH based at least in part on when the UE decodes the second DCI.

In some aspects, a base station for wireless communication may include memory and one or more processors coupled to the memory. For example, the one or more processors may be operatively, electronically, communicatively, or otherwise coupled to the memory. The memory may include instructions executable by the one or more processors to cause the base station to determine that an end of a first DCI and an end of a second DCI are to be received by a UE at a same symbol, and determine that the UE is to decode the first DCI and the second DCI in an order that is based at least in part on one or more properties of the first DCI, one or more properties of the second DCI, or a combination thereof. The memory may include instructions executable by the one or more processors to cause the base station to transmit a first PDSCH based at least in part on when the UE is to decode the first DCI, and transmit a second PDSCH based at least in part on when the UE is to decode the second DCI.

In some aspects, an apparatus for wireless communication may include means for determining that a first distance between an end of a first DCI to be received by a UE and a corresponding first PDSCH to be received by the UE satisfies a minimum distance threshold, means for determining that a second distance between an end of a second DCI to be received by the UE and a corresponding second PDSCH to be received by the UE satisfies the minimum distance threshold, where the end of the first DCI and the end of the second DCI are to be received by the UE at a same symbol, and means for transmitting the first DCI, the first PDSCH, the second DCI, and the second PDSCH based at least in part on the determining that the first distance satisfies the minimum distance threshold and that the second distance satisfies the minimum distance threshold.

In some aspects, an apparatus for wireless communication may include means for determining that an end of a first DCI and an end of a second DCI are to be received from a base station at a same symbol, means for decoding the first DCI and the second DCI in an order that is based at least in part on one or more properties of the first DCI, one or more properties of the second DCI, or a combination thereof, means for receiving a first PDSCH based at least in part on when the apparatus decodes the first DCI, and means for receiving a second PDSCH based at least in part on when the apparatus decodes the second DCI.

In some aspects, an apparatus for wireless communication may include means for determining that an end of a first DCI and an end of a second DCI are to be received by a UE at a same symbol, means for determining that the UE is to decode the first DCI and the second DCI in an order that is based at least in part on one or more properties of the first DCI, one or more properties of the second DCI, or a combination thereof, means for transmitting a first PDSCH based at least in part on when the UE is to decode the first DCI, and means for transmitting a second PDSCH based at least in part on when the UE is to decode the second DCI.

In some aspects, a method of wireless communication performed by a UE includes determining that an end of a first DCI and an end of a second DCI are expected to be received at different symbols, and decoding the first DCI and the second DCI in an order that is based at least in part on one or more properties of the first DCI, one or more properties of the second DCI, or a combination thereof. The method includes receiving a first PDSCH based at least in part on when the UE decodes the first DCI, and receiving a second PDSCH based at least in part on when the UE decodes the second DCI.

In some aspects, a method of wireless communication performed by a base station includes determining that an end of a first DCI and an end of a second DCI are to be received by a UE at different symbols, and determining that the UE is to decode the first DCI and the second DCI in an order that is based at least in part on one or more properties of the first DCI, one or more properties of the second DCI, or a combination thereof. The method includes transmitting a first PDSCH based at least in part on when the UE is to decode the first DCI, and transmitting a second PDSCH based at least in part on when the UE is to decode the second DCI.

In some aspects, a UE for wireless communication includes memory and one or more processors coupled to the memory, the memory and the one or more processors configured to determine that an end of a first DCI and an end of a second DCI are expected to be received at different symbols, and decode the first DCI and the second DCI in an order that is based at least in part on one or more properties of the first DCI, one or more properties of the second DCI, or a combination thereof. The one or more processors are configured to receive a first PDSCH based at least in part on when the UE decodes the first DCI, and receive a second PDSCH based at least in part on when the UE decodes the second DCI.

In some aspects, a base station for wireless communication includes memory and one or more processors coupled to the memory, the memory and the one or more processors configured to determine that an end of a first DCI and an end of a second DCI are to be received by a UE at different symbols, and determine that the UE is to decode the first DCI and the second DCI in an order that is based at least in part on one or more properties of the first DCI, one or more properties of the second DCI, or a combination thereof. The one or more processors are configured to transmit a first PDSCH based at least in part on when the UE is to decode the first DCI, and transmit a second PDSCH based at least in part on when the UE is to decode the second DCI.

In some aspects, a non-transitory computer-readable medium stores one or more instructions for wireless communication, where the one or more instructions, when executed by one or more processors of a UE, cause the UE to determine that an end of a first DCI and an end of a second DCI are expected to be received at different symbols, decode the first DCI and the second DCI in an order that is based at least in part on one or more properties of the first DCI, one or more properties of the second DCI, or a combination thereof, receive a first PDSCH based at least in part on when the UE decodes the first DCI, and receive a second PDSCH based at least in part on when the UE decodes the second DCI.

In some aspects, a non-transitory computer-readable medium stores one or more instructions for wireless communication, where the one or more instructions, when executed by one or more processors of a base station, cause the base station to determine that an end of a first DCI and an end of a second DCI are to be received by a UE at different symbols, determine that the UE is to decode the first DCI and the second DCI in an order that is based at least in part on one or more properties of the first DCI, one or more properties of the second DCI, or a combination thereof, transmit a first PDSCH based at least in part on when the UE is to decode the first DCI, and transmit a second PDSCH based at least in part on when the UE is to decode the second DCI.

In some aspects, an apparatus for wireless communication includes means for determining that an end of a first DCI and an end of a second DCI are expected to be received at different symbols, means for decoding the first DCI and the second DCI in an order that is based at least in part on one or more properties of the first DCI, one or more properties of the second DCI, or a combination thereof, means for receiving a first PDSCH based at least in part on when the apparatus decodes the first DCI, and means for receiving a second PDSCH based at least in part on when the apparatus decodes the second DCI.

In some aspects, an apparatus for wireless communication includes means for determining that an end of a first DCI and an end of a second DCI are to be received by a UE at different symbols, means for determining that the UE is to decode the first DCI and the second DCI in an order that is based at least in part on one or more properties of the first DCI, one or more properties of the second DCI, or a combination thereof, means for transmitting a first PDSCH based at least in part on when the UE is to decode the first DCI, and means for transmitting a second PDSCH based at least in part on when the UE is to decode the second DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
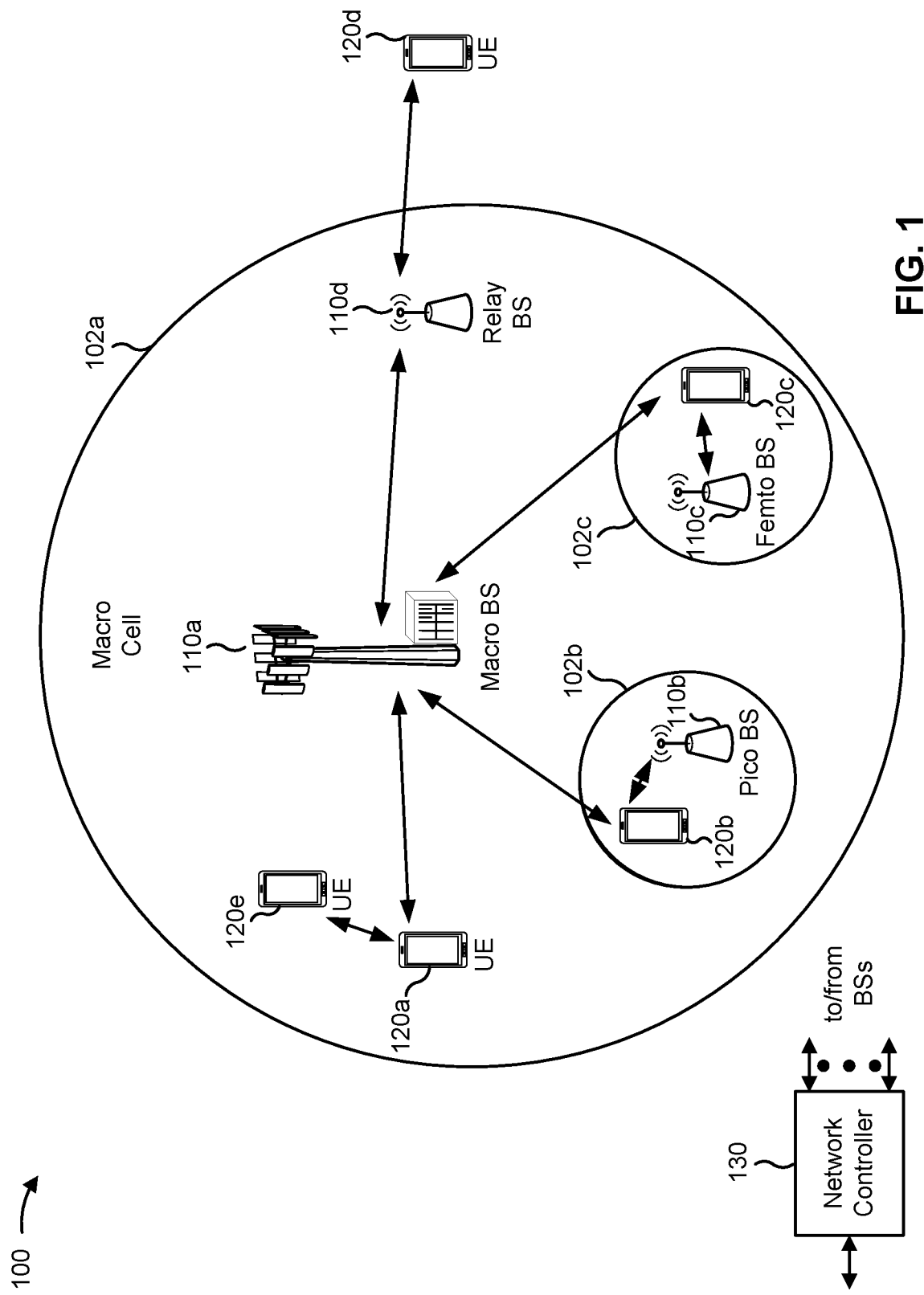
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
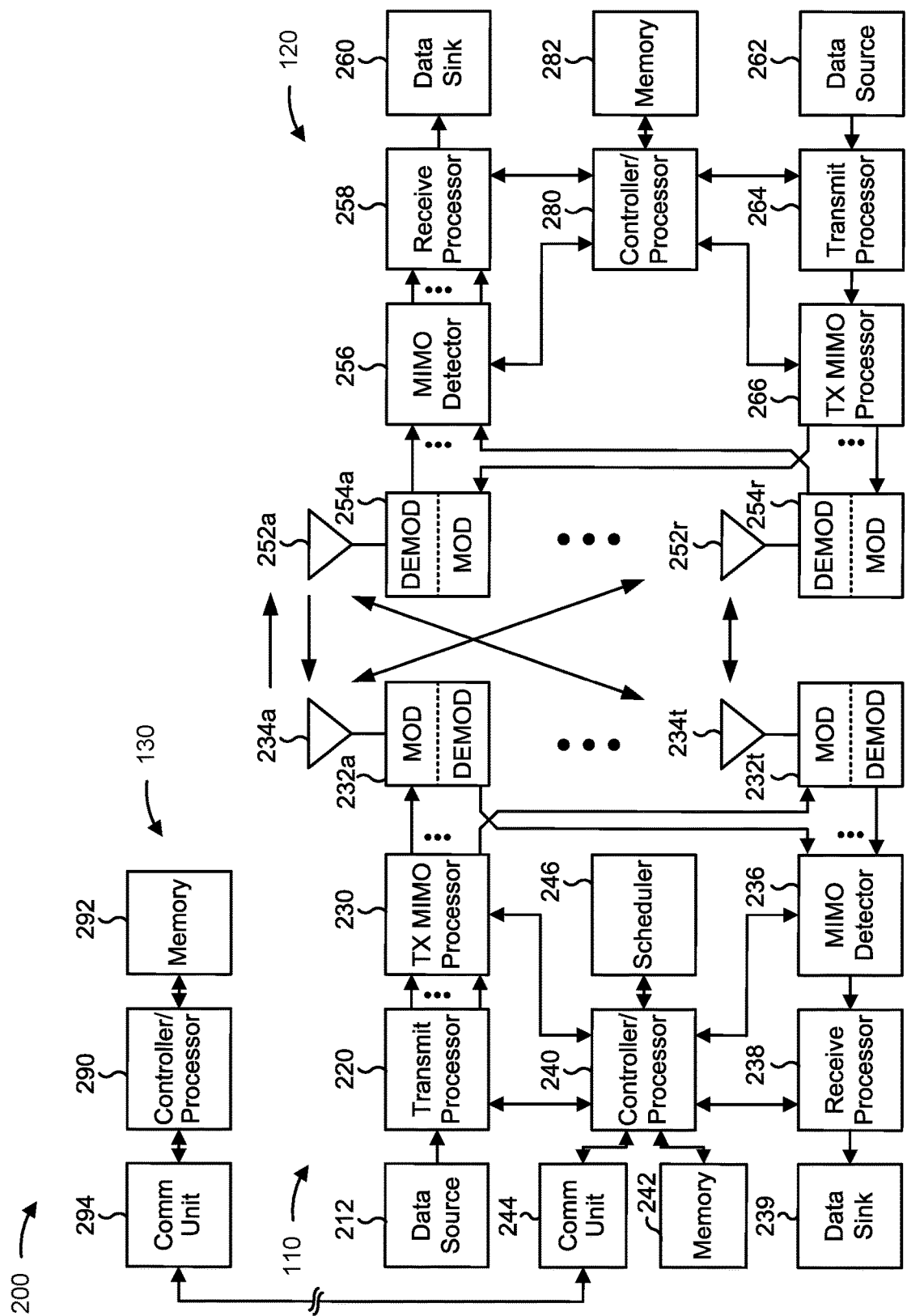
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-16.

Controller/processor 240 of base station 110, controller/processor 280 of UE 120, and/or any other component(s) of FIG. 2 may perform one or more techniques associated with decoding physical downlink control channels (PDCCHs), such as a first downlink control information (DCI) and a second DCI, that end at the same symbol, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1100 of FIG. 11, process 1200 of FIG. 12, process 1300 of FIG. 13, process 1500 of FIG. 15, process 1600 of FIG. 16, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, base station 110 may include means for determining that a first distance between an end of a first DCI to be received by a UE and a corresponding first physical downlink shared channel (PDSCH) to be received by the UE satisfies a minimum distance threshold, means for determining that a second distance between an end of a second DCI to be received by the UE and a corresponding second PDSCH to be received by the UE satisfies the minimum distance threshold, where the end of the first DCI and the end of the second DCI are to be received by the UE at a same symbol, means for transmitting the first DCI, the first PDSCH, the second DCI, and the second PDSCH based at least in part on the determining that the first distance satisfies the minimum distance threshold and that the second distance satisfies the minimum distance threshold, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for determining that an end of a first DCI and an end of a second DCI are to be received from a base station at a same symbol, means for decoding the first DCI and the second DCI in an order that is based at least in part on one or more properties of the first DCI, one or more properties of the second DCI, or a combination thereof, means for receiving a first PDSCH based at least in part on when the apparatus decodes the first DCI, means for receiving a second PDSCH based at least in part on when the apparatus decodes the second DCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining that an end of a first DCI and an end of a second DCI are to be received by a UE at a same symbol, means for determining that the UE is to decode the first DCI and the second DCI in an order that is based at least in part on one or more properties of the first DCI, one or more properties of the second DCI, or a combination thereof, means for transmitting a first PDSCH based at least in part on when the UE is to decode the first DCI, means for transmitting a second PDSCH based at least in part on when the UE is to decode the second DCI, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 includes means for determining that an end of a first DCI and an end of a second DCI are expected to be received at different symbols, means for decoding the first DCI and the second DCI in an order that is based at least in part on one or more properties of the first DCI, one or more properties of the second DCI, or a combination thereof; means for receiving a first PDSCH based at least in part on when UE 120 decodes the first DCI; and/or means for receiving a second PDSCH based at least in part on when the UE decodes the second DCI. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, base station 110 includes means for determining that an end of a first DCI and an end of a second DCI are to be received by a UE at different symbols; means for determining that the UE is to decode the first DCI and the second DCI in an order that is based at least in part on one or more properties of the first DCI, one or more properties of the second DCI, or a combination thereof; means for transmitting a first PDSCH based at least in part on when the UE is to decode the first DCI; and/or means for transmitting a second PDSCH based at least in part on when the UE is to decode the second DCI. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

As indicated above, FIG. 2 is provided as an example. Other examples may differ from what is described with regard to FIG. 2.

Figure 3:
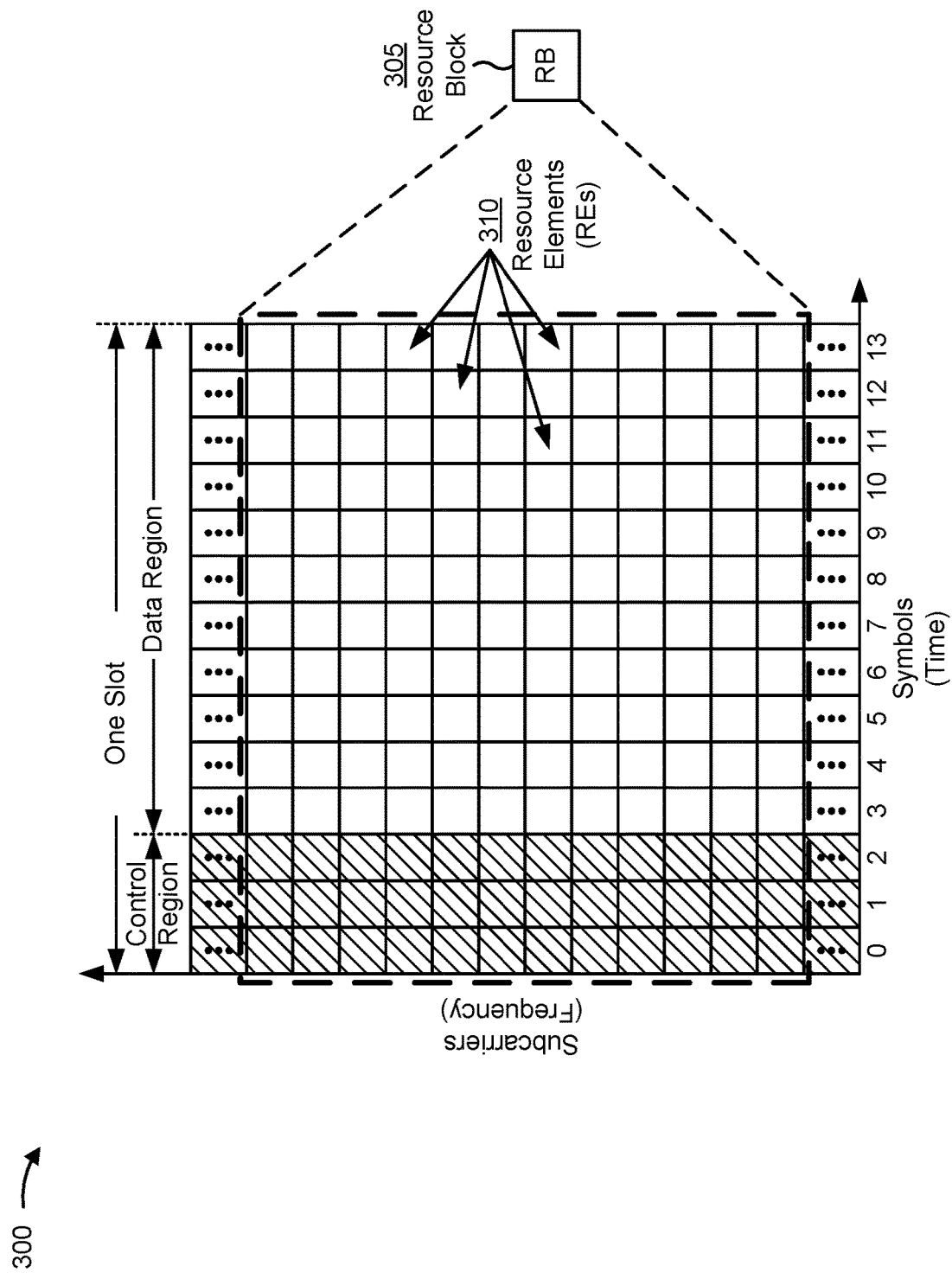
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured. In some communications systems, such as 5G or NR, a UE may transmit a communication to a base station on a physical uplink channel (e. g., a physical uplink control channel (PUCCH), a physical uplink shared channel (PUSCH), and/or the like) in one or more slots.

As indicated above, FIG. 3 is provided as an example. Other examples may differ from what is described with respect to FIG. 3.

Figure 4:
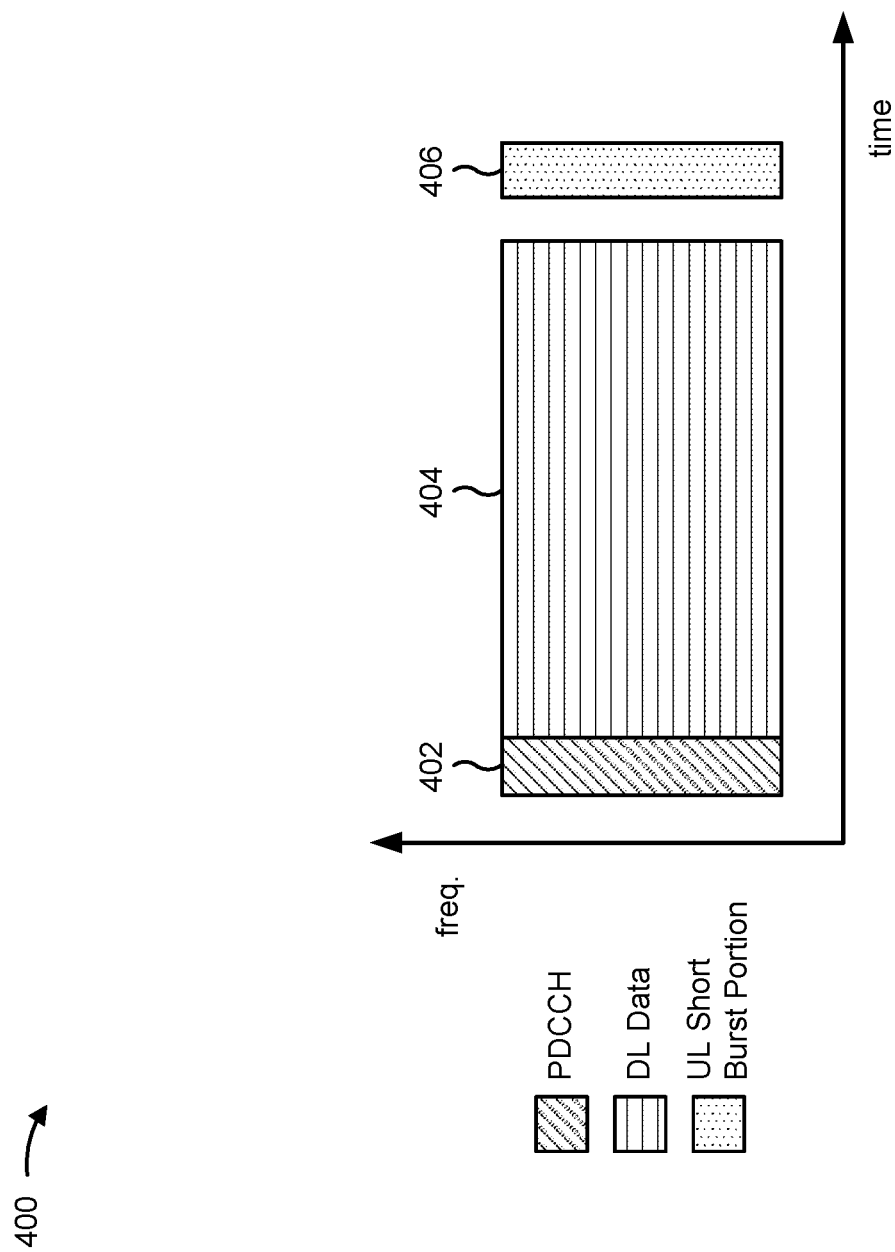
FIG. 4 is a diagram showing an example of a downlink-centric slot or wireless communication structure, in accordance with various aspects of the present disclosure.

FIG. 4 is a diagram 400 showing an example of a downlink (DL)-centric slot or wireless communication structure, in accordance with various aspects of the present disclosure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a PDCCH, as indicated in FIG. 4. In some aspects, the control portion 402 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a PDSCH.

The DL-centric slot may also include an uplink (UL) short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include an acknowledgement (ACK) signal (e.g., a PUCCH ACK, a PUSCH ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 4 is provided as an example. Other examples may differ from what is described with regard to FIG. 4.

Figure 5:
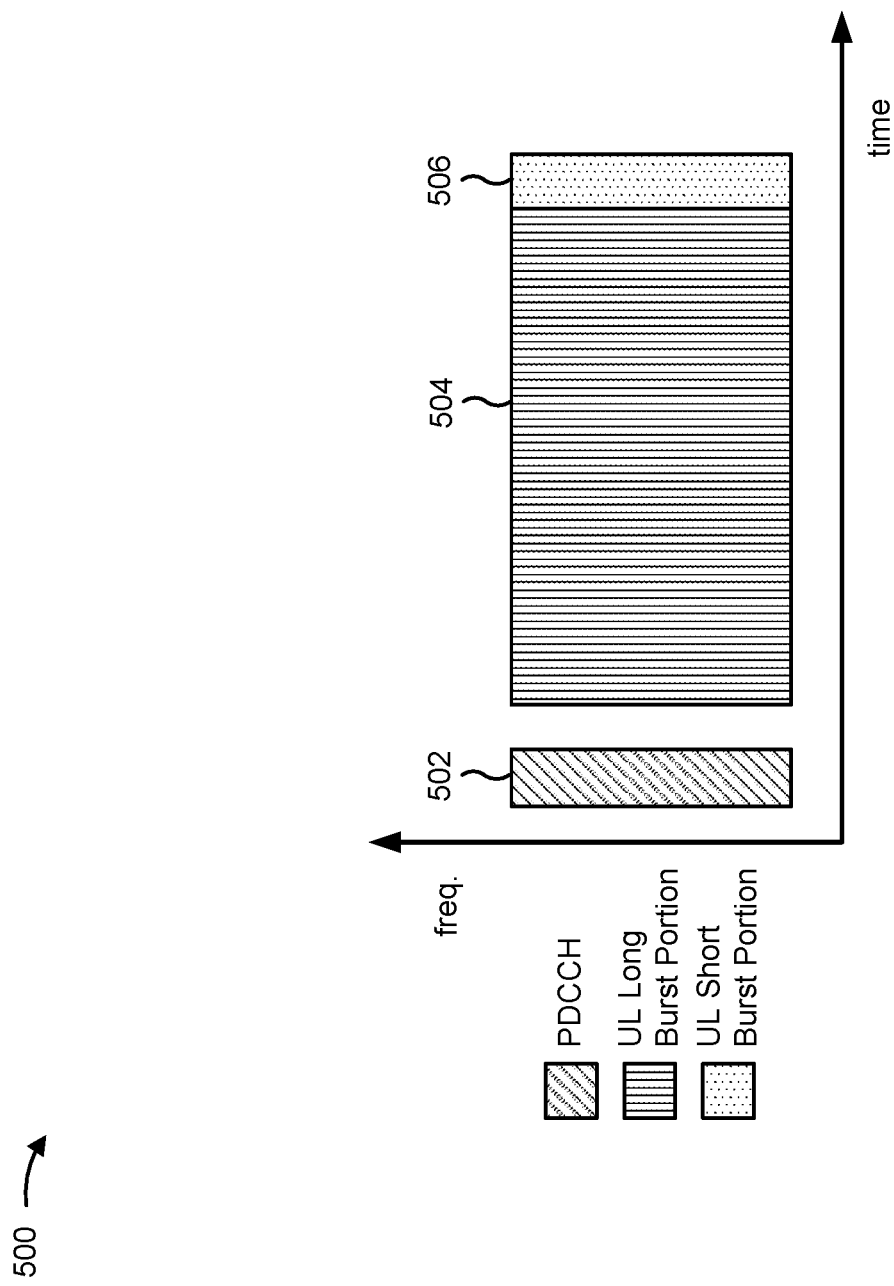
FIG. 5 is a diagram showing an example of an uplink-centric slot or wireless communication structure, in accordance with various aspects of the present disclosure.

FIG. 5 is a diagram 500 showing an example of an UL-centric slot or wireless communication structure, in accordance with various aspects of the present disclosure. The UL-centric slot may include a control portion 502. The control portion 502 may exist in the initial or beginning portion of the UL-centric slot. The control portion 502 in FIG. 5 may be similar to the control portion 502 described above with reference to FIG. 5. The UL-centric slot may also include an UL long burst portion 504. The UL long burst portion 504 may sometimes be referred to as the payload of the UL-centric slot. "UL portion" may refer to the communication resources utilized to communicate UL data from the subordinate entity (e.g., UE) to the scheduling entity (e.g., UE or BS). In some configurations, the control portion 502 may be a PDCCH.

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is one example of an UL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
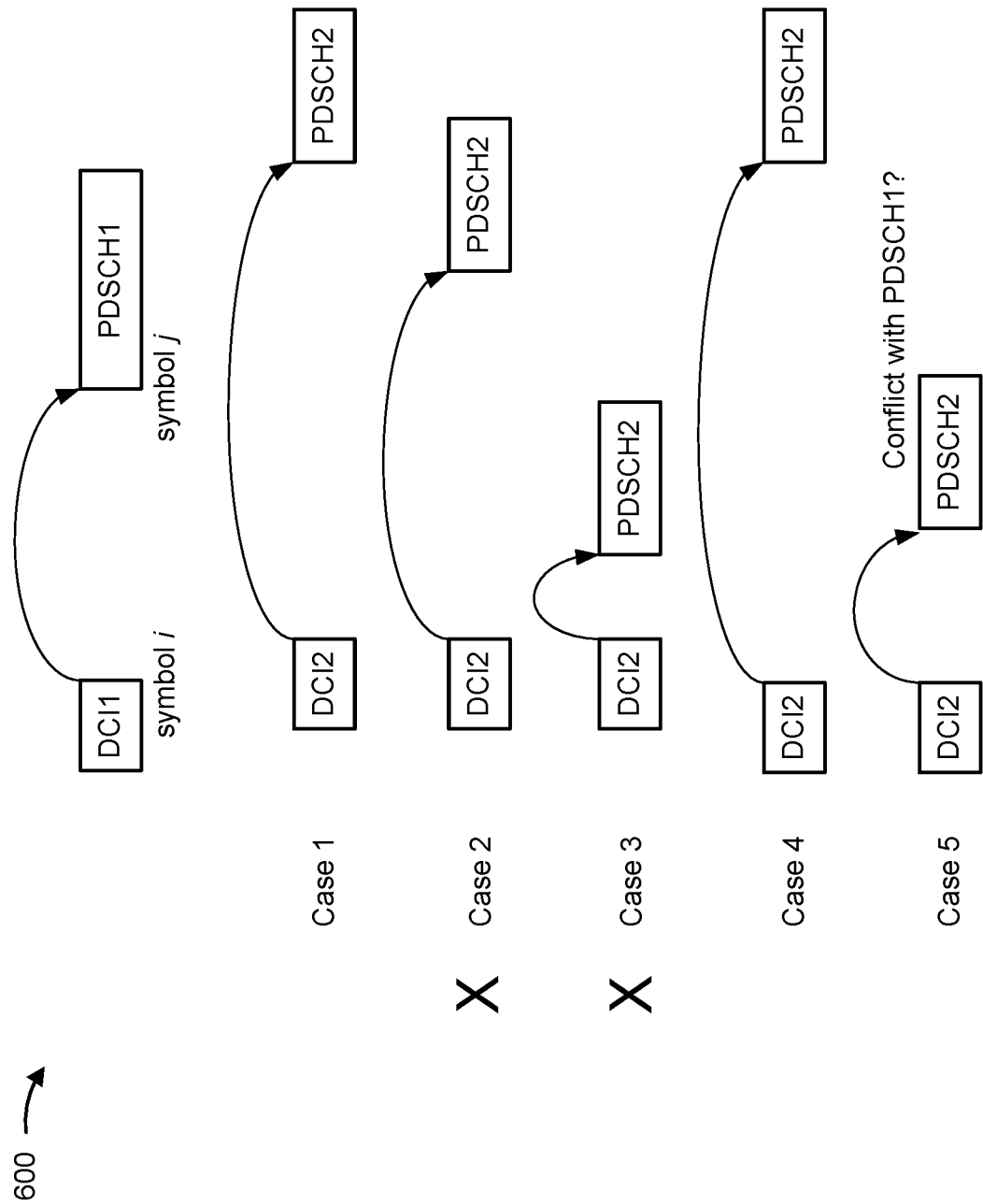
FIG. 6 illustrates examples of physical downlink control channel (PDCCH) and physical downlink shared channel (PDSCH) scheduling, in accordance with various aspects of the present disclosure.

FIG. 6 illustrates examples 600 of PDCCH and PDSCH scheduling, in accordance with various aspects of the present disclosure.

A base station may transmit a PDCCH to schedule resources for a corresponding PDSCH (e.g., PDSCH1). The PDCCH (or PDCCH candidate) may include a DCI (e.g., DCI1). A UE may receive DCI1, where an end of DCI1 is received at a symbol (e.g., symbol i). The UE may decode DCI1 in order to receive PDSCH1, as shown in FIG. 6. The UE may take a certain amount of time (e.g., quantity of symbols) to decode DCI1 and thus PDSCH1 may start at a later symbol (e.g., symbol j). The UE may also receive DCI2, where an end of DCI2 is later than the end of DCI1. The UE may decode DCI2 in order to receive PDSCH2, as shown by Case 1 in FIG. 6. If the end of DCI2 is received after the end of DCI1, NR scheduling rules implemented at the base station may not allow PDSCH2 to be scheduled until after an end of PDSCH1. Accordingly, Case 1 in FIG. 6 shows PDSCH2 starting after PDSCH1 ends. As shown by Case 2 and Case 3 in FIG. 6, the UE may not expect PDSCH2 to start earlier than an end of PDSCH1.

The UE may decode DCIs in an order in which the DCIs arrive. However, if the UE receives the end of DCI1 and the end of DCI2 at the same symbol, such as shown by Cases 4 and 5 in FIG. 6, there may be an issue. Case 4 shows that the UE decodes DCI2 after DCI1, and thus PDSCH2 starts after PDSCH1. There is no issue in Case 4. If the UE is unaware of which DCI to decode first and decodes DCI2 first, as shown by Case 5, the shortened timeline for decoding DCI2 may cause the UE to run out of time for decoding DCI1. There is a question as to whether the scheduling of PDSCH2 will conflict with the scheduling of PDSCH1. This may cause a data transfer to fail (loss of PDSCH1), which may waste processing resources and signaling resources of the UE and the base station.

As indicated above, FIG. 6 is provided as one or more examples. Other examples may differ from what is described with regard to FIG. 6.

Figure 7:
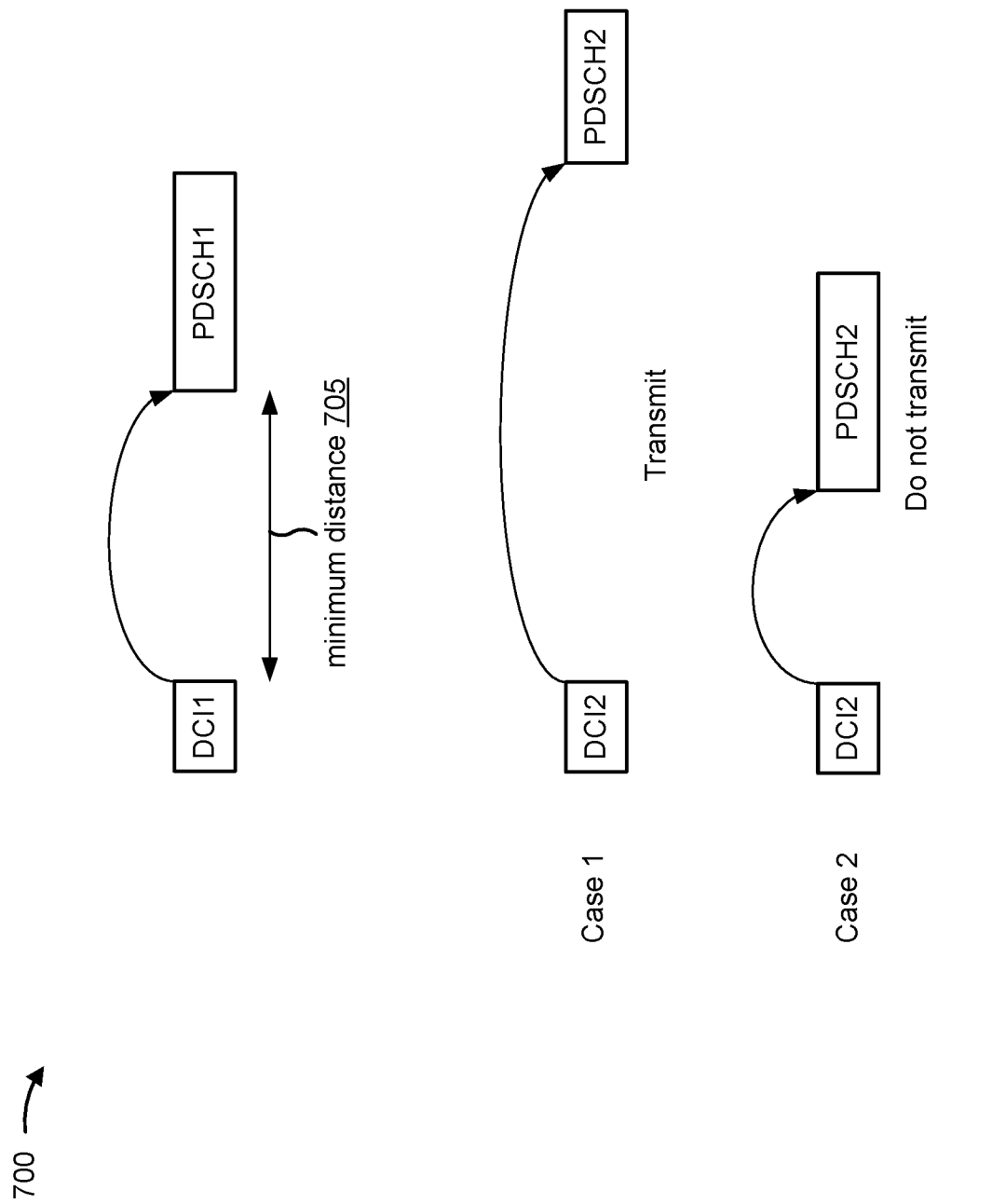
FIG. 7 illustrates examples of decoding PDCCHs that end at the same symbol, in accordance with various aspects of the present disclosure.

FIG. 7 illustrates examples 700 of decoding PDCCHs that end at the same symbol, in accordance with various aspects of the present disclosure. FIG. 7 shows a minimum distance 705 between DCI1 and PDSCH1.

According to various aspects described herein, the base station may determine whether a first distance between DCI1 and PDSCH1 satisfies a minimum distance threshold and determine whether a second distance between DCI2 and PDSCH2 satisfies the minimum distance threshold. The base station may determine the minimum distance threshold based at least in part on a UE capability for decoding DCIs, DCI decoding times, a DCI size, a PDSCH size, a quantity of DCIs that are to be transmitted, an expected size of the first distance (e.g., symbols), an expected size of the second distance, or a combination thereof. If the first distance and the second distance satisfy the minimum distance threshold, such as shown by Case 1 in FIG. 7, the base station may transmit DCI1 and DCI2. In this way, if DCI1 and DCI2 are received such that the end of DCI1 and the end of DCI2 are received at the same symbol, the UE may decode either DCI1 or DCI2 first and not have an issue with which PDSCH is scheduled first. There will be adequate time to decode DCI1 and DCI2. If the base station determines that there is not adequate time to decode DCI1 and DCI2, in any order, such as shown by Case 2 in FIG. 7, the base station may refrain from transmitting DCI1 and DCI2 if the end of DCI1 and the end of DCI2 are to end at the same symbol. The UE may avoid decoding DCI1 and DCI2 in an order where there is a PDSCH scheduling conflict or a loss of a PDSCH. As a result, the UE and the base station avoid wasting processing resources and signaling resources handling a PDSCH conflict or a loss of a PDSCH.

As indicated above, FIG. 7 is provided as one or more examples. Other examples may differ from what is described with regard to FIG. 7.

Figure 8:
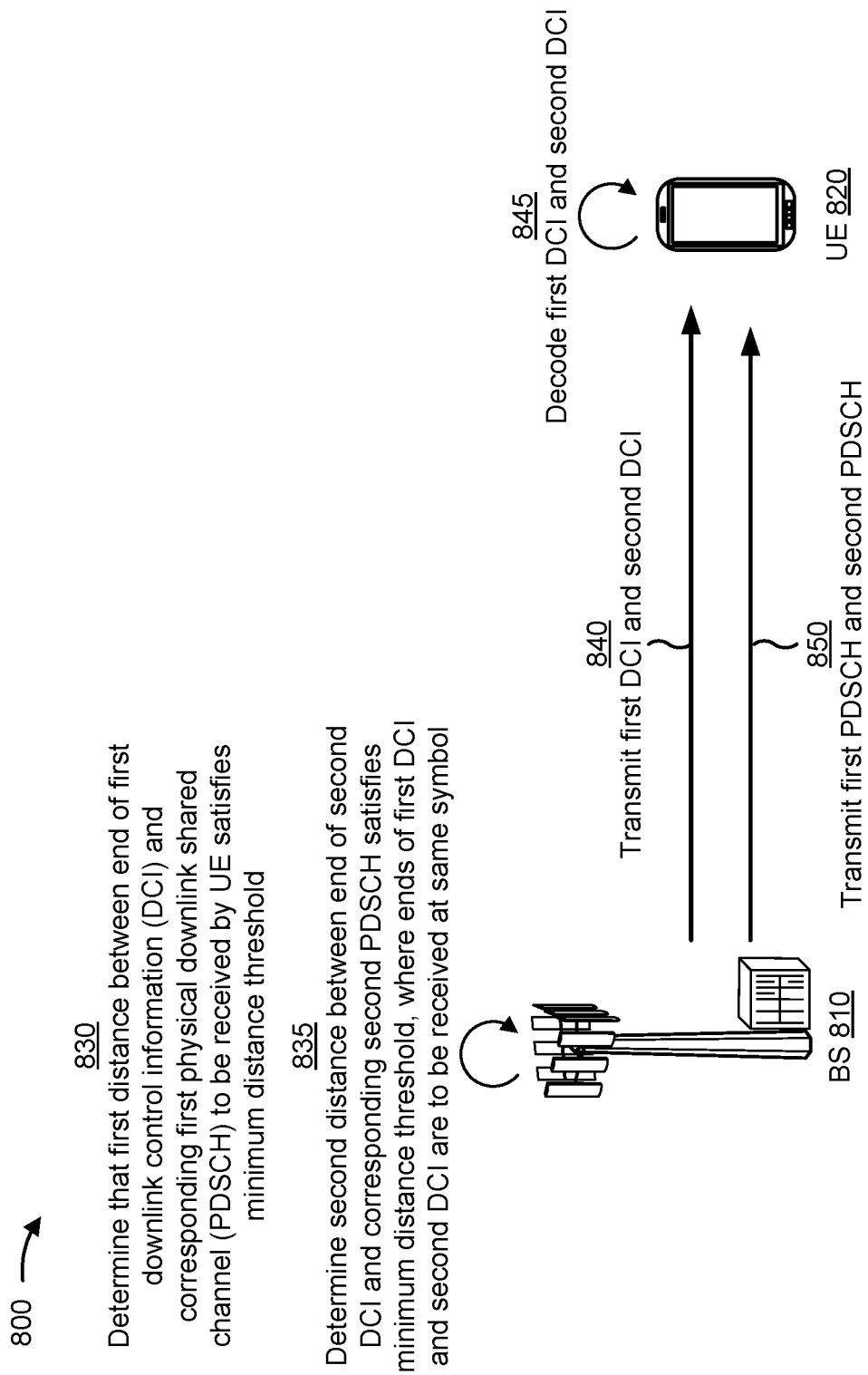
FIG. 8 is a diagram illustrating an example of decoding PDCCHs that end at the same symbol, in accordance with various aspects of the present disclosure.

FIG. 8 is a diagram illustrating an example 800 of decoding PDCCHs, such as DCIs, that end at the same symbol, in accordance with various aspects of the present disclosure. FIG. 8 shows a BS 810 (e.g., a BS 110 depicted in FIGS. 1 and 2, and/or the like) and a UE 820 (e.g., a UE 120 depicted in FIGS. 1 and 2 and/or the like) that may communicate with each other.

As shown by reference number 830, BS 810 may determine that a first distance between an end of a first DCI to be received by UE 820 and a corresponding first PDSCH satisfies a minimum distance threshold. In some aspects, the first distance, the second distance, and/or the minimum distance may be defined as a distance between an end of a PDCCH (e.g., DCI) and a start of a corresponding PDSCH. The distance may be defined in terms of time, quantity of symbols, and/or the like. Alternatively, in some aspects, the first distance, the second distance, and/or the minimum distance may be defined as a distance between an end of a PDCCH (e.g., DCI) and an end of a corresponding PDSCH.

As shown by reference number 835, BS 810 may determine that a second distance between an end of a second DCI to be received by UE 820 and a corresponding second PDSCH satisfies the minimum distance threshold. The first DCI and the second DCI may end at a same time or a same symbol. While reference is made to a single minimum distance threshold, in some aspects, the minimum distance threshold may include separate distance thresholds for the first distance and the second distance. In some aspects, BS 810 may determine whether the first distance (and likewise the second distance) satisfies the minimum distance threshold by comparing the first distance (e.g., in symbols) and the minimum distance threshold.

As shown by reference number 840, BS 810 may transmit the first DCI and the second DCI based at least in part on the first distance and the second distance satisfying the minimum distance threshold. As shown by reference number 845, UE 820 may decode the first DCI and the second DCI to determine a schedule for receiving the first PDSCH and the second PDSCH. As shown by reference number 850, BS 810 may transmit the first PDSCH and the second PDSCH.

As indicated above, FIG. 8 is provided as an example. Other examples may differ from what is described with respect to FIG. 8.

Figure 9:
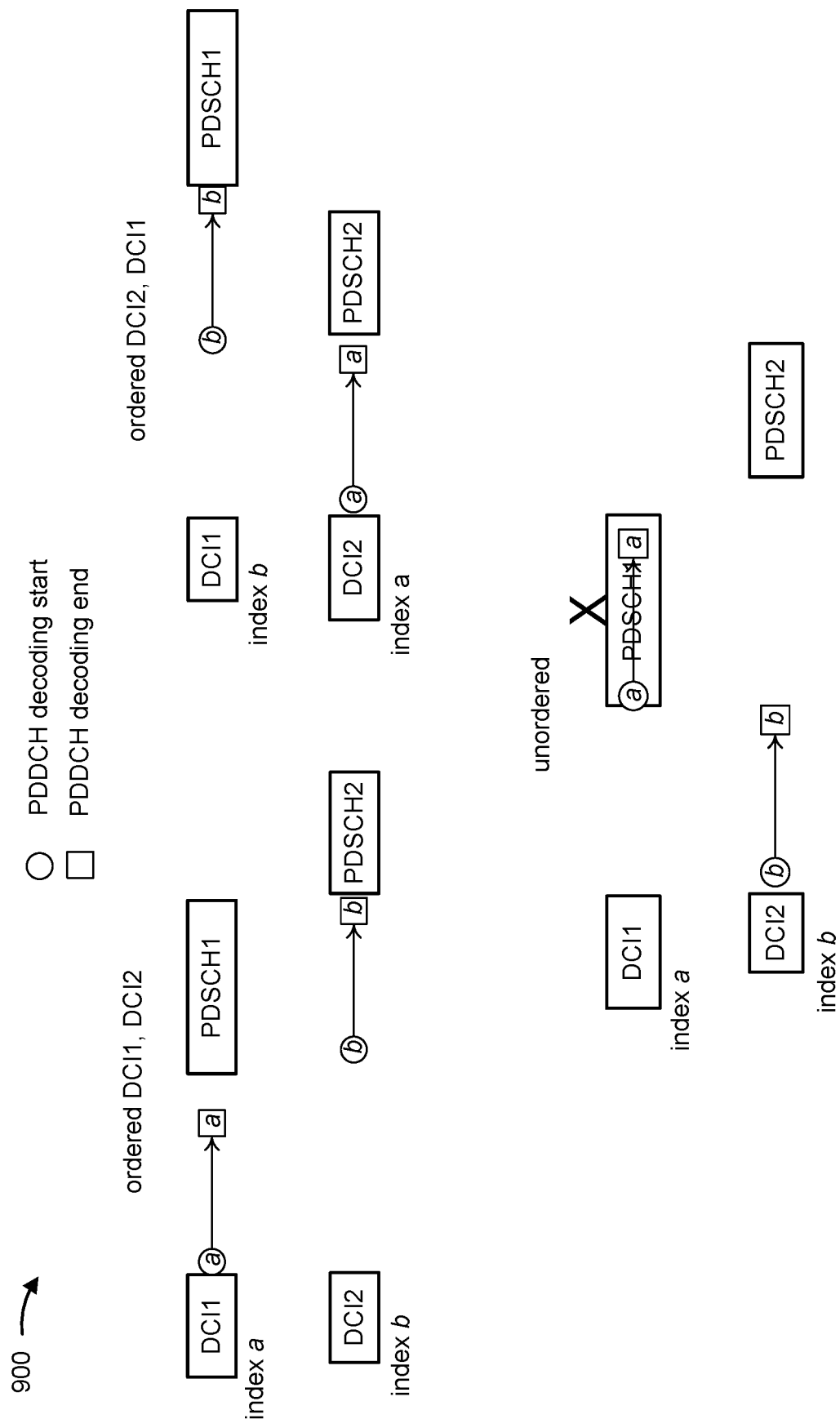
FIG. 9 illustrates examples of decoding PDCCHs that end at the same symbol, in accordance with various aspects of the present disclosure.

FIG. 9 illustrates examples 900 of decoding PDCCHs that end at the same symbol, in accordance with various aspects of the present disclosure. FIG. 9 shows a first PDCCH (e.g., DCI1) that ends at a same symbol as a second PDCCH (e.g., DCI2). DCI1 is decoded for PDSCH1, and DCI2 is decoded for PDSCH2.

In some aspects, if DCI1 and DCI2 end at a same symbol, the UE may determine an order in which to decode DCI1 and DCI2 based at least in part on one or more properties of DCI1, one or more properties of DCI2, or a combination thereof. This may include determining which PDSCH is to arrive first. For example, the order of decoding the first DCI and the second DCI may be based at least in part on an order of a starting symbol of the first DCI and a starting symbol of the second DCI. A smaller starting symbol index of a PDCCH candidate may correspond to a smaller PDCCH candidate ordering index. "PDCCH candidate ordering index" may refer to an order of a PDCCH candidate (e.g., potential DCI transmission from gNB) with respect to other PDCCH candidates for the decoding by the UE.

As shown in FIG. 9, DCI1 starts at a symbol of index a, and DCI2 starts at a symbol of index b. Because index a comes before index b, even though DCI1 and DCI2 end at the same symbol, the UE may decode DCI1 first, and PDSCH1 may be scheduled before PDSCH2. In a similar scenario, if DCI2 starts before DCI1, the UE may decode DCI2 first, and PDSCH2 may be scheduled before PDSCH1. Without this specified order, the UE could decode DCI2 before DCI1, which could be a problem if PDSCH1 is scheduled before PDSCH2. This is shown by the unordered example at the bottom of FIG. 9.

In some aspects, the order of decoding the first DCI and the second DCI may be based at least in part on an order of a control resource set (CORESET) identifier for the first DCI and a CORESET identifier (ID) for the second DCI. A CORESET may define frequency resource blocks and an OFDM symbol duration for a control region for PDCCH monitoring. A smaller CORESET ID may correspond to a smaller PDCCH candidate ordering index.

In some aspects, the order of decoding the first DCI and the second DCI may be based at least in part on an order of a search space set identifier for the first DCI and a search space set identifier for the second DCI. A search space set defines a time domain starting symbol of the control region for PDCCH monitoring. A smaller search space set ID may correspond to a smaller PDCCH candidate ordering index.

In some aspects, the order of decoding the first DCI and the second DCI may be based at least in part on an aggregation level for the first DCI and an aggregation level for the second DCI. An aggregation level may correspond to a quantity of control channel elements assigned to a PDCCH candidate. A smaller aggregation level may correspond to a smaller PDCCH candidate ordering index.

In some aspects, the order of decoding the first DCI and the second DCI may be based at least in part on an order of a PDCCH candidate index of the first DCI and a PDCCH candidate index of the second DCI. A smaller PDCCH candidate index may correspond to a smaller PDCCH candidate ordering index.

The UE may determine the order of decoding DCIs based at least in part on an order of arrival of PDSCHs. In some aspects, receiving the first PDSCH and receiving the second PDSCH may include receiving the first PDSCH and the second PDSCH in an order that is based at least in part on an order of a starting symbol index of the first PDSCH and a starting symbol index of the second PDSCH. Alternatively, in some aspects, receiving the first PDSCH and receiving the second PDSCH may include receiving the first PDSCH and the second PDSCH in an order that is based at least in part on an order of an ending symbol index of the first PDSCH and an ending symbol index of the second PDSCH.

The base station may indicate an order of PDSCHs using candidate ordering indices for the PDSCHs. A candidate ordering index of a PDSCH may indicate to the UE that it is associated with a candidate ordering index of a PDCCH candidate (e.g., DCI). For example, the order of decoding the first DCI and the second DCI may be based at least in part on an order of a candidate ordering index of the first PDSCH and a candidate ordering index of the second PDSCH. In other words, if the UE decodes DCIs from a lower ordering index to a higher ordering index, the UE may first decode the DCI for a PDSCH with a smaller ordering index.

As indicated above, FIG. 9 is provided as one or more examples. Other examples may differ from what is described with respect to FIG. 9.

Figure 10:
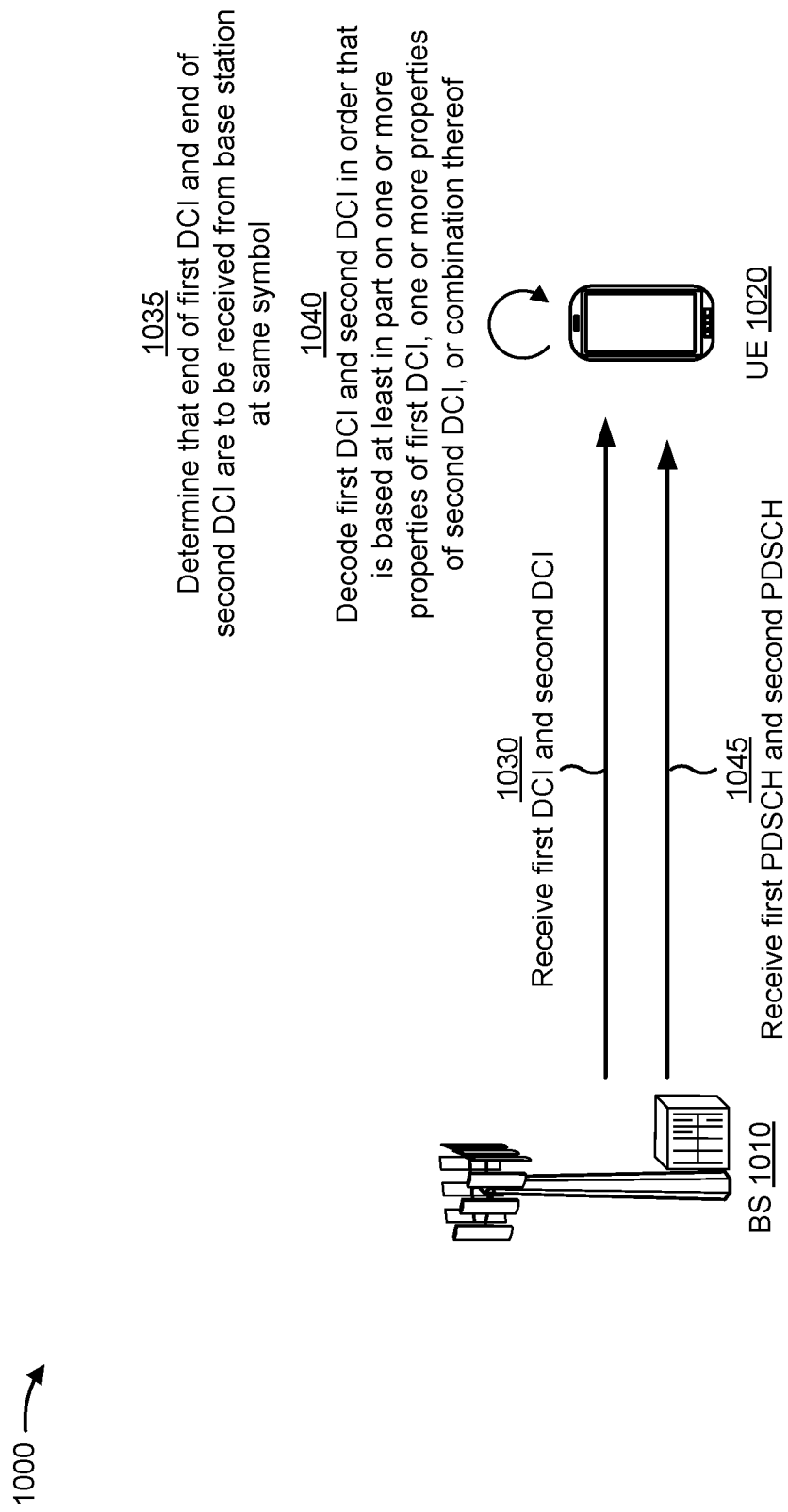
FIG. 10 is a diagram illustrating an example of decoding PDCCHs that end at the same symbol, in accordance with various aspects of the present disclosure.

FIG. 10 is a diagram illustrating an example 1000 of decoding PDCCHs that end at the same symbol, in accordance with various aspects of the present disclosure. FIG. 10 shows a BS 1010 (e.g., a BS 110 depicted in FIGS. 1 and 2, a BS 810 depicted in FIG. 8, and/or the like) and a UE 1020 (e.g., a UE 120 depicted in FIGS. 1 and 2, a UE 820 depicted in FIG. 8, and/or the like) that may communicate with each other.

As shown by reference number 1030, UE 1020 may receive a first DCI and a second DCI from BS 1010. As shown by reference number 1035, UE 1020 may determine that the first DCI and the second DCI end at the same symbol. As shown by reference number 1040, UE 1020 may decode the first DCI and the second DCI in an order that is based at least in part on one or more properties of the first DCI, one or more properties of the second DCI, or a combination thereof. For example, as described in connection with FIG. 9, UE 1020 may compare a property (e.g., candidate ordering index, CORESET ID, search space set ID, aggregation level, and/or the like) of the first DCI or first PDSCH and a property of the second DCI or PDSCH. The UE may determine the order to decode the first DCI and the second DCI based at least in part on as result of the comparison.

As shown by reference number 1045, UE 1020 may receive the first PDSCH and the second PDSCH in an order that is based at least in part on an order that UE 1020 decodes the first DCI and the second DCI. Both BS 1010 and UE 1020 may operate based at least in part on the same ordering rules, such that BS 1010 is aware of when UE 1020 is to receive a particular DCI or a particular PDSCH. As a result of a deliberate order for decoding DCIs, BS 1010 and UE 1020 avoid wasting processing resources and signaling resources due to handling conflicting PDSCHs or losing PDSCHs.

As indicated above, FIG. 10 is provided as an example. Other examples may differ from what is described with respect to FIG. 10.

Figure 11:
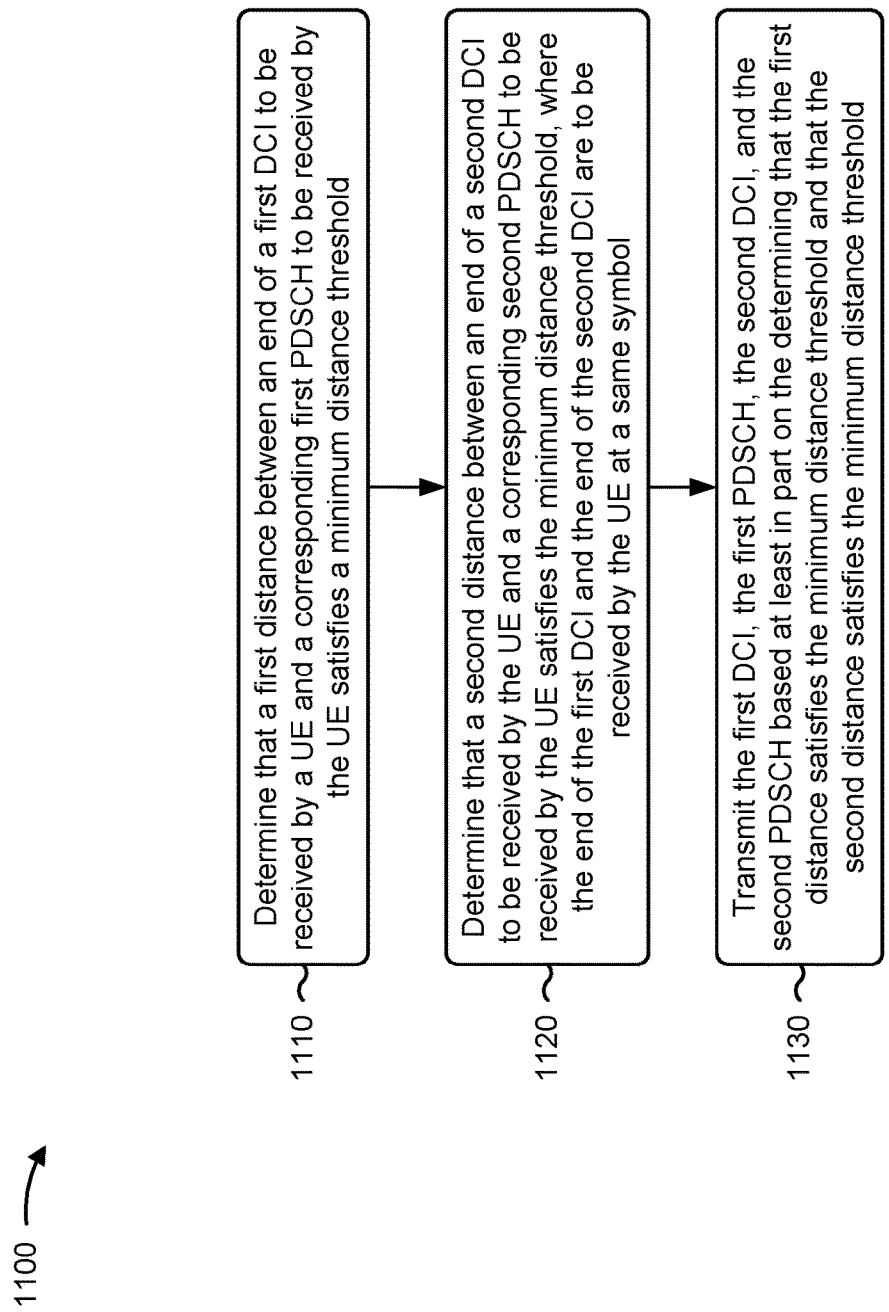
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., a BS 110 depicted in FIGS. 1 and 2, a BS 810 depicted in FIG. 8, a BS 1010 depicted in FIG. 10, and/or the like) performs operations associated with decoding PDCCHs that end at the same symbol.

As shown in FIG. 11, in some aspects, process 1100 may include determining that a first distance between an end of a first DCI to be received by a UE and a corresponding first PDSCH to be received by the UE satisfies a minimum distance threshold (block 1110). For example, the base station (e.g., using transmit processor 220, receive processor 238, controller/processor 240, memory 242, and/or the like) may determine that a first distance between an end of a first DCI to be received by a UE and a corresponding first PDSCH to be received by the UE satisfies a minimum distance threshold, as described above.

As further shown in FIG. 11, in some aspects, process 1100 may include determining that a second distance between an end of a second DCI to be received by the UE and a corresponding second PDSCH to be received by the UE satisfies the minimum distance threshold (block 1120). For example, the base station (e.g., using transmit processor 220, receive processor 238, controller/processor 240, memory 242, and/or the like) may determine that a second distance between an end of a second DCI to be received by the UE and a corresponding second PDSCH to be received by the UE satisfies the minimum distance threshold, as described above. In some aspects, the end of the first DCI and the end of the second DCI are to be received by the UE at a same symbol.

As further shown in FIG. 11, in some aspects, process 1100 may include transmitting the first DCI, the first PDSCH, the second DCI, and the second PDSCH based at least in part on the determining that the first distance satisfies the minimum distance threshold and that the second distance satisfies the minimum distance threshold (block 1130). For example, the base station (e.g., using transmit processor 220, receive processor 238, controller/processor 240, memory 242, and/or the like) may transmit the first DCI, the first PDSCH, the second DCI, and the second PDSCH based at least in part on the determining that the first distance satisfies the minimum distance threshold and that the second distance satisfies the minimum distance threshold, as described above.

Process 1100 may include additional aspects, such as any single aspect or any combination of aspects described below and/or in connection with one or more other processes described elsewhere herein.

In a first aspect, the first distance is between the end of the first DCI and a start of the first PDSCH, and the second distance is between the end of the second DCI and a start of the second PDSCH.

In a second aspect, alone or in combination with the first aspect, the first distance is between the end of the first DCI and an end of the first PDSCH, and the second distance is between the end of the second DCI and an end of the second PDSCH.

In a third aspect, alone or in combination with one or more of the first and second aspects, the first distance is a first quantity of symbols, the second distance is a second quantity of symbols, and the minimum distance threshold is a third quantity of symbols.

In a fourth aspect, alone or in combination with one or more of the first through third aspects, process 1100 includes scheduling the first PDSCH and the second PDSCH via unicast scheduling only.

In a fifth aspect, alone or in combination with one or more of the first through fourth aspects, process 1100 includes scheduling the first PDSCH and the second PDSCH via unicast scheduling or broadcast scheduling.

In a sixth aspect, alone or in combination with one or more of the first through fifth aspects, transmitting the first DCI, the first PDSCH, the second DCI, and the second PDSCH includes transmitting the first DCI, the first PDSCH, the second DCI, and the second PDSCH based at least in part on the determining that the first distance satisfies the minimum distance threshold and that the second distance satisfies the minimum distance threshold, and based at least in part on a type of the UE.

In a seventh aspect, alone or in combination with one or more of the first through sixth aspects, transmitting the first DCI, the first PDSCH, the second DCI, and the second PDSCH includes transmitting the first DCI, the first PDSCH, the second DCI, and the second PDSCH based at least in part on the determining that the first distance satisfies the minimum distance threshold and that the second distance satisfies the minimum distance threshold, and based at least in part on a capability of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
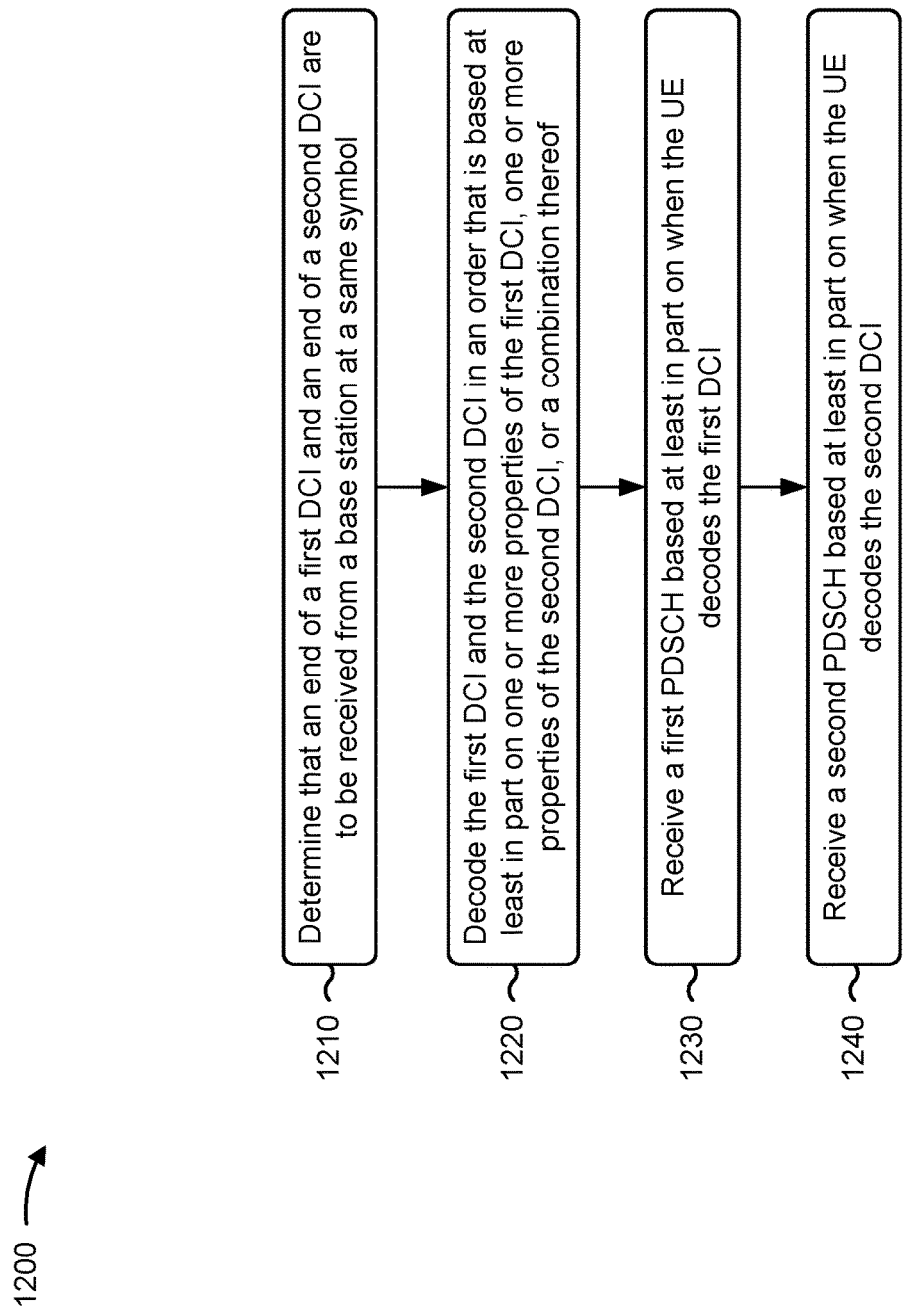
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure. Example process 1200 is an example where the UE (e.g., a UE 120 depicted in FIGS. 1 and 2, a UE 820 depicted in FIG. 8, a UE 1020 depicted in FIG. 10, and/or the like) performs operations associated with decoding PDCCHs that end at the same symbol.

As shown in FIG. 12, in some aspects, process 1200 may include determining that an end of a first DCI and an end of a second DCI are to be received from a base station at a same symbol (block 1210). For example, the UE (e.g., using receive processor 258, transmit processor 264, controller/processor 280, memory 282, and/or the like) may determine that an end of a first DCI and an end of a second DCI are to be received from a base station at a same symbol, as described above.

As further shown in FIG. 12, in some aspects, process 1200 may include decoding the first DCI and the second DCI in an order that is based at least in part on one or more properties of the first DCI, one or more properties of the second DCI, or a combination thereof (block 1220). For example, the UE (e.g., using receive processor 258, transmit processor 264, controller/processor 280, memory 282, and/or the like) may decode the first DCI and the second DCI in an order that is based at least in part on one or more properties of the first DCI, one or more properties of the second DCI, or a combination thereof, as described above.

As further shown in FIG. 12, in some aspects, process 1200 may include receiving a first PDSCH based at least in part on when the UE decodes the first DCI (block 1230). For example, the UE (e.g., using receive processor 258, transmit processor 264, controller/processor 280, memory 282, and/or the like) may receive a first PDSCH based at least in part on when the UE decodes the first DCI, as described above.

As further shown in FIG. 12, in some aspects, process 1200 may include receiving a second PDSCH based at least in part on when the UE decodes the second DCI (block 1240). For example, the UE (e.g., using receive processor 258, transmit processor 264, controller/processor 280, memory 282, and/or the like) may receive a second PDSCH based at least in part on when the UE decodes the second DCI, as described above.

Process 1200 may include additional aspects, such as any single aspect or any combination of aspects described below and/or in connection with one or more other processes described elsewhere herein.

In a first aspect, the order of decoding the first DCI and the second DCI is based at least in part on an order of a starting symbol of the first DCI and a starting symbol of the second DCI.

In a second aspect, alone or in combination with the first aspect, the order of decoding the first DCI and the second DCI is based at least in part on an order of a CORESET identifier for the first DCI and a CORESET identifier for the second DCI.

In a third aspect, alone or in combination with one or more of the first and second aspects, the order of decoding the first DCI and the second DCI is based at least in part on an order of a search space set identifier for the first DCI and a search space set identifier for the second DCI.

In a fourth aspect, alone or in combination with one or more of the first through third aspects, the order of decoding the first DCI and the second DCI is based at least in part on an aggregation level for the first DCI and an aggregation level for the second DCI.

In a fifth aspect, alone or in combination with one or more of the first through fourth aspects, the order of decoding the first DCI and the second DCI is based at least in part on an order of a candidate index of the first DCI and a candidate index of the second DCI.

In a sixth aspect, alone or in combination with one or more of the first through fifth aspects, receiving the first PDSCH and receiving the second PDSCH includes receiving the first PDSCH and the second PDSCH in an order that is based at least in part on an order of a starting symbol index of the first PDSCH and a starting symbol index of the second PDSCH.

In a seventh aspect, alone or in combination with one or more of the first through sixth aspects, receiving the first PDSCH and receiving the second PDSCH includes receiving the first PDSCH and the second PDSCH in an order that is based at least in part on an order of an ending symbol index of the first PDSCH and an ending symbol index of the second PDSCH.

In an eighth aspect, alone or in combination with one or more of the first through seventh aspects, the order of decoding the first DCI and the second DCI is based at least in part on an order of a candidate ordering index of the first PDSCH and a candidate ordering index of the second PDSCH.

In a ninth aspect, alone or in combination with one or more of the first through eighth aspects, the first PDSCH and the second PDSCH are scheduled via unicast scheduling only.

In a tenth aspect, alone or in combination with one or more of the first through ninth aspects, the first PDSCH and the second PDSCH are scheduled via unicast scheduling or broadcast scheduling.

In an eleventh aspect, alone or in combination with one or more of the first through tenth aspects, determining that the end of the first DCI and the end of the second DCI are expected to be received at different symbols includes determining that the end of the first DCI and the end of the second DCI are expected to be received at different symbols based at least in part on a type of the UE.

In a twelfth aspect, alone or in combination with one or more of the first through eleventh aspects, process 1200 includes transmitting an indication of a type of the UE.

In a thirteenth aspect, alone or in combination with one or more of the first through twelfth aspects, process 1200 includes transmitting a capability of the UE for receiving the end of the first DCI and the end of the second DCI at different symbols or at the same symbol.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
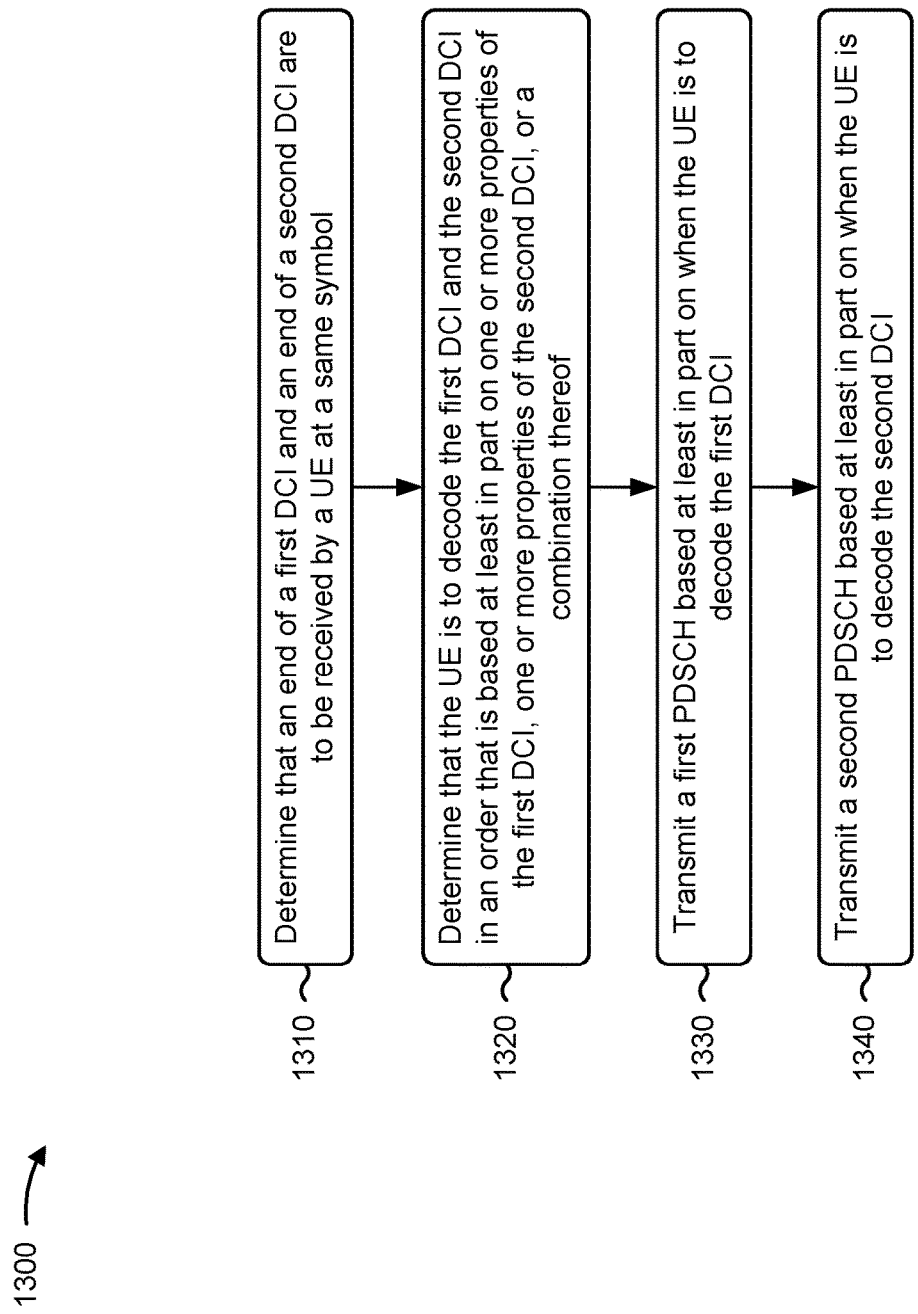
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., a BS 110 depicted in FIGS. 1 and 2, a BS 810 depicted in FIG. 8, a BS 1010 depicted in FIG. 10, and/or the like) performs operations associated with decoding PDCCHs that end at the same symbol.

As shown in FIG. 13, in some aspects, process 1300 may include determining that an end of a first DCI and an end of a second DCI are to be received by a UE at a same symbol (block 1310). For example, the base station (e.g., using transmit processor 220, receive processor 238, controller/processor 240, memory 242, and/or the like) may determine that an end of a first DCI and an end of a second DCI are to be received by a UE at a same symbol, as described above.

As further shown in FIG. 13, in some aspects, process 1300 may include determining that the UE is to decode the first DCI and the second DCI in an order that is based at least in part on one or more properties of the first DCI, one or more properties of the second DCI, or a combination thereof (block 1320). For example, the base station (e.g., using transmit processor 220, receive processor 238, controller/processor 240, memory 242, and/or the like) may determine that the UE is to decode the first DCI and the second DCI in an order that is based at least in part on one or more properties of the first DCI, one or more properties of the second DCI, or a combination thereof, as described above.

As further shown in FIG. 13, in some aspects, process 1300 may include transmitting a first PDSCH based at least in part on when the UE is to decode the first DCI (block 1330). For example, the base station (e.g., using transmit processor 220, receive processor 238, controller/processor 240, memory 242, and/or the like) may transmit a first PDSCH based at least in part on when the UE is to decode the first DCI, as described above.

As further shown in FIG. 13, in some aspects, process 1300 may include transmitting a second PDSCH based at least in part on when the UE is to decode the second DCI (block 1340). For example, the base station (e.g., using transmit processor 220, receive processor 238, controller/processor 240, memory 242, and/or the like) may transmit a second PDSCH based at least in part on when the UE is to decode the second DCI, as described above.

Process 1300 may include additional aspects, such as any single aspect or any combination of aspects described below and/or in connection with one or more other processes described elsewhere herein.

In a first aspect, the order of decoding the first DCI and the second DCI is based at least in part on an order of a starting symbol of the first DCI and a starting symbol of the second DCI.

In a second aspect, alone or in combination with the first aspect, the order of decoding the first DCI and the second DCI is based at least in part on an order of a CORESET identifier for the first DCI and a CORESET identifier for the second DCI.

In a third aspect, alone or in combination with one or more of the first and second aspects, the order of decoding the first DCI and the second DCI is based at least in part on an order of a search space set identifier for the first DCI and a search space set identifier for the second DCI.

In a fourth aspect, alone or in combination with one or more of the first through third aspects, the order of decoding the first DCI and the second DCI is based at least in part on an aggregation level for the first DCI and an aggregation level for the second DCI.

In a fifth aspect, alone or in combination with one or more of the first through fourth aspects, the order of decoding the first DCI and the second DCI is based at least in part on an order of a candidate index of the first DCI and a candidate index of the second DCI.

In a sixth aspect, alone or in combination with one or more of the first through fifth aspects, transmitting the first PDSCH and transmitting the second PDSCH includes transmitting the first PDSCH and the second PDSCH in an order that is based at least in part on an order of a starting symbol index of the first PDSCH and a starting symbol index of the second PDSCH.

In a seventh aspect, alone or in combination with one or more of the first through sixth aspects, transmitting the first PDSCH and transmitting the second PDSCH includes transmitting the first PDSCH and the second PDSCH in an order that is based at least in part on an order of an ending symbol index of the first PDSCH and an ending symbol index of the second PDSCH.

In an eighth aspect, alone or in combination with one or more of the first through seventh aspects, the order of decoding the first DCI and the second DCI is based at least in part on an order of a candidate ordering index of the first PDSCH and a candidate ordering index of the second PDSCH.

In a ninth aspect, alone or in combination with one or more of the first through eighth aspects, process 1300 includes scheduling the first PDSCH and the second PDSCH via unicast scheduling only.

In a tenth aspect, alone or in combination with one or more of the first through ninth aspects, process 1300 includes scheduling the first PDSCH and the second PDSCH via unicast scheduling or broadcast scheduling.

In an eleventh aspect, alone or in combination with one or more of the first through tenth aspects, transmitting the first DCI, the first PDSCH, the second DCI, and the second PDSCH includes transmitting the first DCI, the first PDSCH, the second DCI, and the second PDSCH based at least in part on a type of the UE.

In a twelfth aspect, alone or in combination with one or more of the first through eleventh aspects, transmitting the first DCI, the first PDSCH, the second DCI, and the second PDSCH includes transmitting the first DCI, the first PDSCH, the second DCI, and the second PDSCH based at least in part on a capability of the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
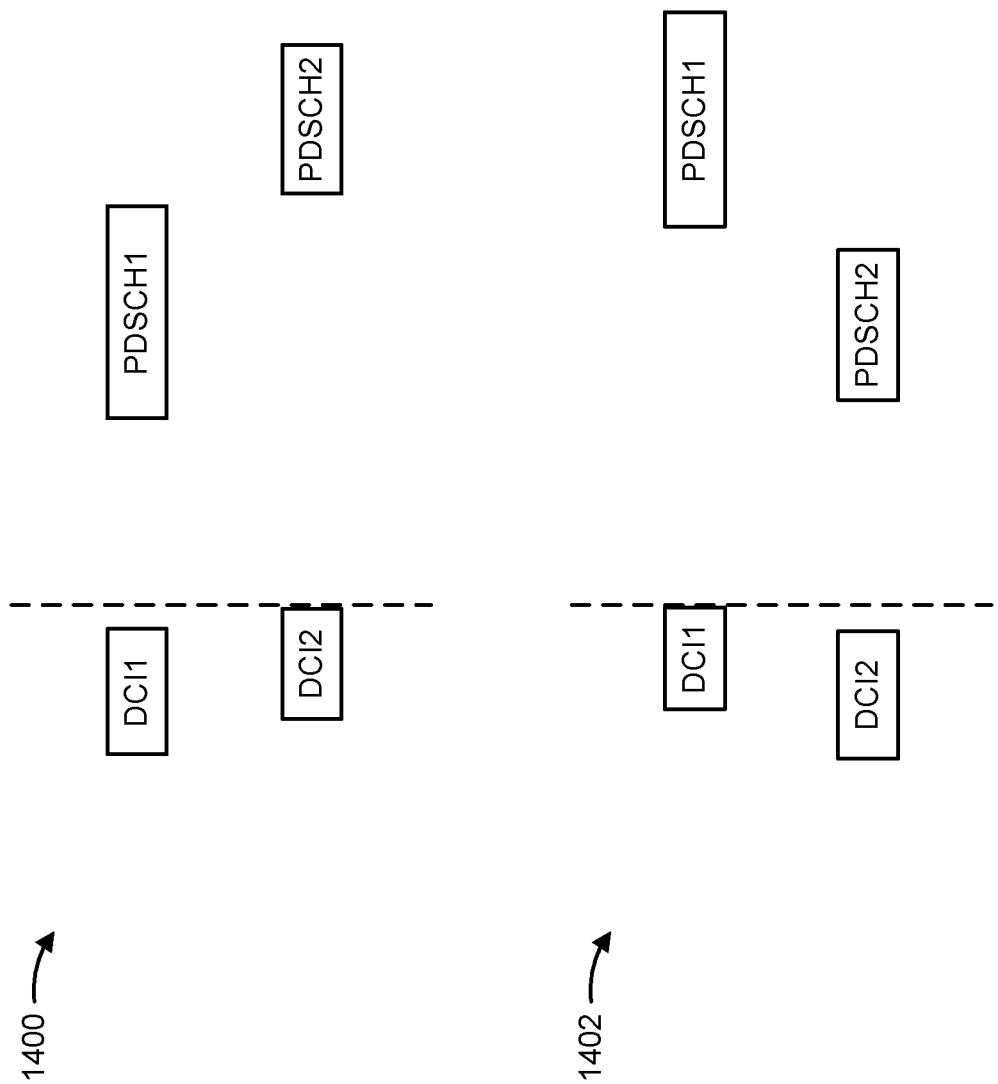
FIG. 14 is a diagram illustrating examples of decoding PDCCHs that end at different symbols, in accordance with various aspects of the present disclosure.

FIG. 14 illustrates examples 1400, 1402 of decoding PDCCHs that end at different symbols, in accordance with various aspects of the present disclosure.

In some aspects, a base station may determine that an end of a first DCI and an end of a second DCI are to be received by a UE at different symbols, and determine that the UE is to decode the first DCI and the second DCI in an order that is based at least in part on one or more properties of the first DCI, one or more properties of the second DCI, or a combination thereof. The base station may transmit a first PDSCH based at least in part on when the UE is to decode the first DCI, and transmit a second PDSCH based at least in part on when the UE is to decode the second DCI. The UE may expect to receive the first DCI and the second DCI at different symbols rather than at the same symbol. That is, the UE may be configured, scheduled, and/or signaled to receive ends of DCIs at different symbols and not configured, scheduled, or signaled to receive ends of DCIs at the same symbol. The UE may not monitor for ends of DCIs to be received at the same symbol. In some aspects, the UE may not prepare to receive both PDSCHs if the ends of DCIs happen to be received at the same symbol. For example, for any two HARQ process IDs in a given scheduled cell, if the UE is scheduled to start receiving a first PDSCH starting in symbol j by a PDCCH ending in symbol i, the UE is not expected to be scheduled to receive a second PDSCH scheduled by a second PDCCH that ends in symbol i.

Example 1400 shows a first DCI (DCI1) that has an end that is received at a symbol that is earlier than a symbol for an end of a second DCI (DCI2). The base station transmits a first PDSCH (PDSCH1) before a second PDSCH (PDSCH2). Example 1402 shows that DCI2 ends before DCI1, and the base station transmits PDSCH2 before PDSCH1.

As indicated above, FIG. 14 provides some examples. Other examples may differ from what is described with regard to FIG. 14.

Figure 15:
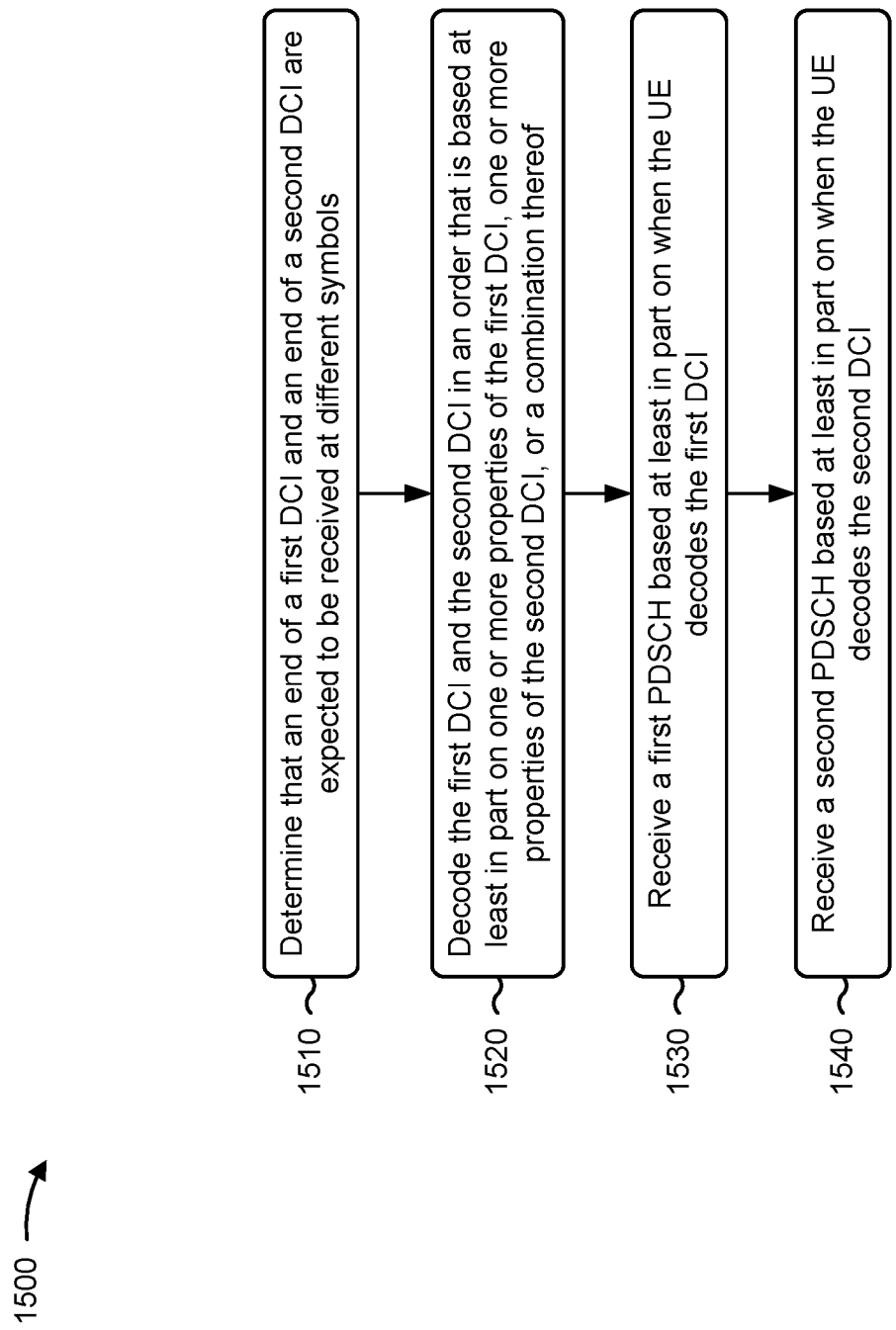
FIG. 15 is a diagram illustrating an example process performed, for example, by a UE, in accordance with various aspects of the present disclosure.

FIG. 15 is a diagram illustrating an example process 1500 performed, for example, by a UE, in accordance with various aspects of the present disclosure. Example process 1500 is an example where the UE (e.g., a UE 120 depicted in FIGS. 1 and 2, a UE 820 depicted in FIG. 8, a UE 1020 depicted in FIG. 10, and/or the like) performs operations associated with decoding of physical downlink control channels ending at the same symbol or different symbols.

As shown in FIG. 15, in some aspects, process 1500 may include determining that an end of a first DCI and an end of a second DCI are expected to be received at different symbols (block 1510). For example, the UE (e.g., using antenna 252, demodulator 254, MIMO detector 256, receive processor 258, transmit processor 264, TX MIMO processor 266, modulator 254, controller/processor 280, and/or memory 282) may determine that an end of a first DCI and an end of a second DCI are expected to be received at different symbols, as described above.

As further shown in FIG. 15, in some aspects, process 1500 may include decoding the first DCI and the second DCI in an order that is based at least in part on one or more properties of the first DCI, one or more properties of the second DCI, or a combination thereof (block 1520). For example, the UE (e.g., using antenna 252, demodulator 254, MIMO detector 256, receive processor 258, transmit processor 264, TX MIMO processor 266, modulator 254, controller/processor 280, and/or memory 282) may decode the first DCI and the second DCI in an order that is based at least in part on one or more properties of the first DCI, one or more properties of the second DCI, or a combination thereof, as described above.

As further shown in FIG. 15, in some aspects, process 1500 may include receiving a first PDSCH based at least in part on when the UE decodes the first DCI (block 1530). For example, the UE (e.g., using antenna 252, demodulator 254, MIMO detector 256, receive processor 258, controller/processor 280, and/or memory 282) may receive a first PDSCH based at least in part on when the UE decodes the first DCI, as described above.

As further shown in FIG. 15, in some aspects, process 1500 may include receiving a second PDSCH based at least in part on when the UE decodes the second DCI (block 1540). For example, the UE (e.g., using antenna 252, demodulator 254, MIMO detector 256, receive processor 258, controller/processor 280, and/or memory 282) may receive a second PDSCH based at least in part on when the UE decodes the second DCI, as described above.

Process 1500 may include additional aspects, such as any single aspect or any combination of aspects described below and/or in connection with one or more other processes described elsewhere herein.

In a first aspect, determining that the end of the first DCI and the end of the second DCI are expected to be received at different symbols includes determining, after determining that the first DCI and the second DCI end at a same symbol, that the second PDSCH will not be scheduled to be received.

In a second aspect, the first PDSCH and the second PDSCH are scheduled via unicast scheduling only.

In a third aspect, the first PDSCH and the second PDSCH are scheduled via unicast scheduling or broadcast scheduling.

In a fourth aspect, determining that the end of the first DCI and the end of the second DCI are expected to be received at different symbols includes determining that the end of the first DCI and the end of the second DCI are expected to be received at different symbols based at least in part on a type of the UE.

In a fifth aspect, process 1500 includes transmitting an indication of a type of the UE.

In a sixth aspect, process 1500 includes transmitting a capability of the UE for receiving the end of the first DCI and the end of the second DCI at different symbols or at the same symbol.

In a seventh aspect, process 1500 includes expecting to receive the end of the first DCI and the end of the second DCI at different symbols, prior to transmitting a capability of the UE for receiving the end of the first DCI and the end of the second DCI at different symbols or at the same symbol.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
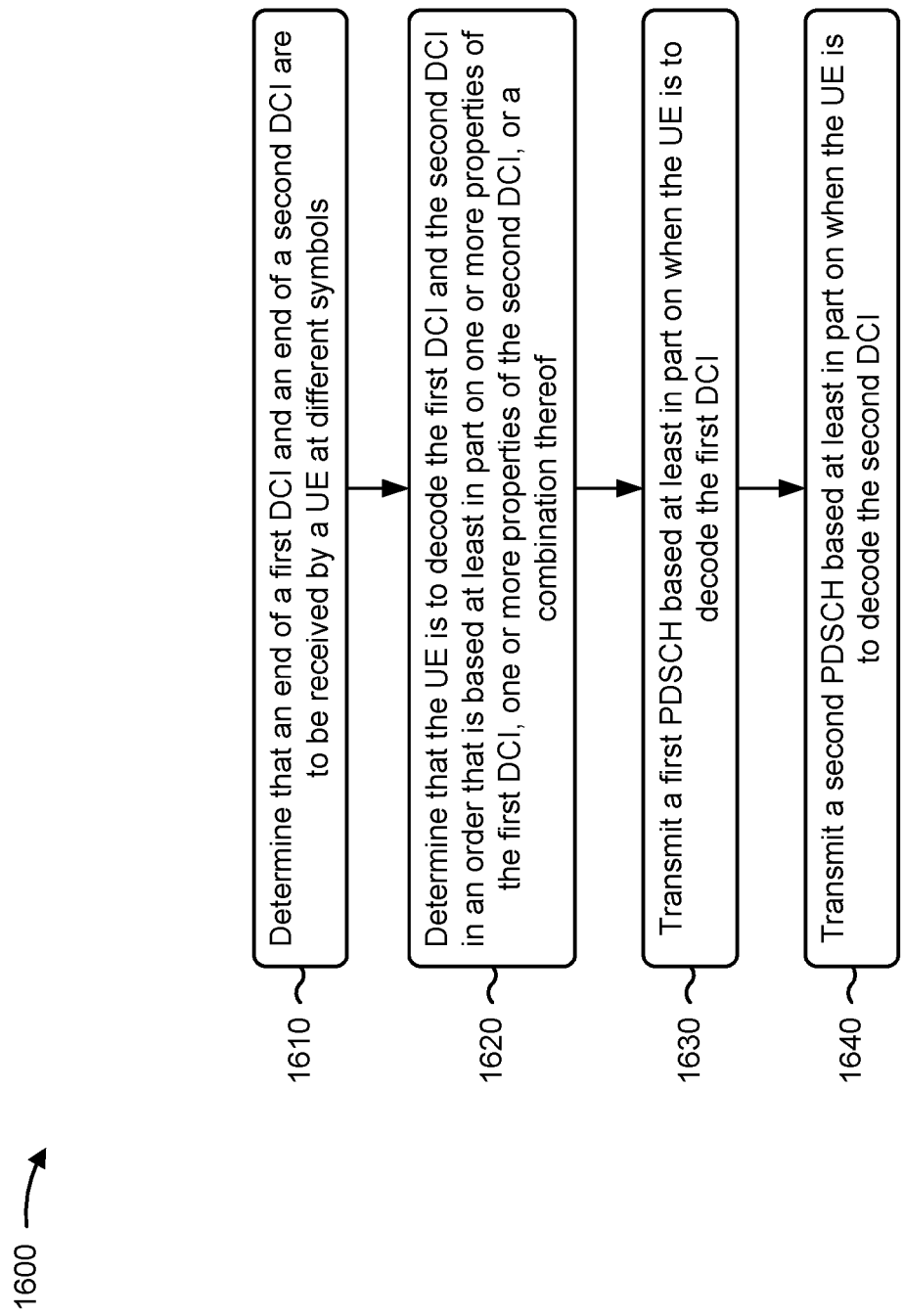
FIG. 16 is a diagram illustrating an example process performed, for example, by a base station, in accordance with various aspects of the present disclosure.

FIG. 16 is a diagram illustrating an example process 1600 performed, for example, by a base station, in accordance with various aspects of the present disclosure. Example process 1600 is an example where the base station (e.g., a BS 110 depicted in FIGS. 1 and 2, a BS 810 depicted in FIG. 8, a BS 1010 depicted in FIG. 10, and/or the like) performs operations associated with decoding of PDCCHs ending at the same symbol or different symbols.

As shown in FIG. 16, in some aspects, process 1600 may include determining that an end of a first DCI and an end of a second DCI are to be received by a UE at different symbols (block 1610). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine that an end of a first DCI and an end of a second DCI are to be received by a UE at different symbols, as described above.

As further shown in FIG. 16, in some aspects, process 1600 may include determining that the UE is to decode the first DCI and the second DCI in an order that is based at least in part on one or more properties of the first DCI, one or more properties of the second DCI, or a combination thereof (block 1620). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine that the UE is to decode the first DCI and the second DCI in an order that is based at least in part on one or more properties of the first DCI, one or more properties of the second DCI, or a combination thereof, as described above.

As further shown in FIG. 16, in some aspects, process 1600 may include transmitting a first PDSCH based at least in part on when the UE is to decode the first DCI (block 1630). For example, the base station (e.g., using transmit processor 220, TX MIMO processor 230, modulator 232, antenna 234, controller/processor 240, memory 242, and/or scheduler 246) may transmit a first PDSCH based at least in part on when the UE is to decode the first DCI, as described above.

As further shown in FIG. 16, in some aspects, process 1600 may include transmitting a second PDSCH based at least in part on when the UE is to decode the second DCI (block 1640). For example, the base station (e.g., using transmit processor 220, TX MIMO processor 230, modulator 232, antenna 234, controller/processor 240, memory 242, and/or scheduler 246) may transmit a second PDSCH based at least in part on when the UE is to decode the second DCI, as described above.

Process 1600 may include additional aspects, such as any single aspect or any combination of aspects described below and/or in connection with one or more other processes described elsewhere herein.

In a first aspect, determining that the end of the first DCI and the end of the second DCI are to be received at different symbols includes refraining from scheduling the second PDSCH after determining that the first DCI and the second DCI end are scheduled to end at a same symbol.

In a second aspect, process 1600 includes scheduling the first PDSCH and the second PDSCH via unicast scheduling only.

In a third aspect, process 1600 includes scheduling the first PDSCH and the second PDSCH via unicast scheduling or broadcast scheduling.

In a fourth aspect, determining that the end of the first DCI and the end of the second DCI are to be received at different symbols includes determining that the end of the first DCI and the end of the second DCI are to be received at different symbols based at least in part on a type of the UE.

In a fifth aspect, process 1600 includes receiving a capability of the UE for receiving the end of the first DCI and the end of the second DCI at different symbols or at the same symbol.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, software, and/or a combination of hardware and software. As used herein, a processor is implemented in hardware, software, and/or a combination of hardware and software. Software is to be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
   determining that a first distance between an end of a first downlink control information (DCI) to be received by a user equipment (UE) and a corresponding first physical downlink shared channel (PDSCH) to be received by the UE satisfies a minimum distance threshold;
   determining that a second distance between an end of a second DCI to be received by the UE and a corresponding second PDSCH to be received by the UE satisfies the minimum distance threshold, wherein the end of the first DCI and the end of the second DCI are to be received by the UE at a same symbol; and
   transmitting the first DCI, the first PDSCH, the second DCI, and the second PDSCH based at least in part on the determining that the first distance satisfies the minimum distance threshold and that the second distance satisfies the minimum distance threshold.

2. The method of claim 1, wherein the first distance is between the end of the first DCI and a start of the first PDSCH, and the second distance is between the end of the second DCI and a start of the second PDSCH.

3. The method of claim 1, wherein the first distance is between the end of the first DCI and an end of the first PDSCH, and the second distance is between the end of the second DCI and an end of the second PDSCH.

4. The method of claim 1, wherein transmitting the first DCI, the first PDSCH, the second DCI, and the second PDSCH includes transmitting the first DCI, the first PDSCH, the second DCI, and the second PDSCH based at least in part on the determining that the first distance satisfies the minimum distance threshold and that the second distance satisfies the minimum distance threshold, and based on at least in part on a type of the UE or a capability of the UE.

5. A method of wireless communication performed by a user equipment (UE), comprising:
   determining that an end of a first downlink control information (DCI) and an end of a second DCI are to be received from a base station at a same symbol;
   decoding the first DCI and the second DCI in an order that is based at least in part on one or more properties of the first DCI, one or more properties of the second DCI, or a combination thereof;
   receiving a first physical downlink shared channel (PDSCH) based at least in part on when the UE decodes the first DCI; and
   receiving a second PDSCH based at least in part on when the UE decodes the second DCI.

6. The method of claim 5, wherein the order of decoding the first DCI and the second DCI is based at least in part on an order of a starting symbol of the first DCI and a starting symbol of the second DCI.

7. The method of claim 5, wherein the order of decoding the first DCI and the second DCI is based at least in part on an order of a control resource set (CORESET) identifier for the first DCI and a CORESET identifier for the second DCI.

8. The method of claim 5, wherein the order of decoding the first DCI and the second DCI is based at least in part on an order of a search space set identifier for the first DCI and a search space set identifier for the second DCI, or an aggregation level for the first DCI and an aggregation level for the second DCI.

9. The method of claim 5, wherein the order of decoding the first DCI and the second DCI is based at least in part on an order of a candidate index of the first DCI and a candidate index of the second DCI.

10. The method of claim 5, wherein receiving the first PDSCH and receiving the second PDSCH includes receiving the first PDSCH and the second PDSCH in an order that is based at least in part on an order of a starting symbol index of the first PDSCH and a starting symbol index of the second PDSCH.

11. The method of claim 5, wherein receiving the first PDSCH and receiving the second PDSCH includes receiving the first PDSCH and the second PDSCH in an order that is based at least in part on an order of an ending symbol index of the first PDSCH and an ending symbol index of the second PDSCH.

12. The method of claim 5, wherein the order of decoding the first DCI and the second DCI is based at least in part on an order of a candidate ordering index of the first PDSCH and a candidate ordering index of the second PDSCH.

13. The method of claim 5, wherein determining that the end of the first DCI and the end of the second DCI are expected to be received at different symbols includes determining that the end of the first DCI and the end of the second DCI are expected to be received at different symbols based at least in part on a type of the UE.

14. The method of claim 5, further comprising transmitting an indication of a type of the UE, or a capability of the UE for receiving the end of the first DCI and the end of the second DCI at different symbols or at the same symbol.

15. A method of wireless communication performed by a base station, comprising:
- determining that an end of a first downlink control information (DCI) and an end of a second DCI are to be received by a user equipment (UE) at a same symbol;
- determining that the UE is to decode the first DCI and the second DCI in an order that is based at least in part on one or more properties of the first DCI, one or more properties of the second DCI, or a combination thereof;
- transmitting a first physical downlink shared channel (PDSCH) based at least in part on when the UE is to decode the first DCI; and
- transmitting a second PDSCH based at least in part on when the UE is to decode the second DCI.

16. The method of claim 15, wherein the order of decoding the first DCI and the second DCI is based at least in part on an order of a starting symbol of the first DCI and a starting symbol of the second DCI.

17. The method of claim 15, wherein the order of decoding the first DCI and the second DCI is based at least in part on an order of a control resource set (CORESET) identifier for the first DCI and a CORESET identifier for the second DCI.

18. The method of claim 15, wherein the order of decoding the first DCI and the second DCI is based at least in part on an order of a search space set identifier for the first DCI and a search space set identifier for the second DCI.

19. The method of claim 15, wherein the order of decoding the first DCI and the second DCI is based at least in part on an aggregation level for the first DCI and an aggregation level for the second DCI.

20. The method of claim 15, wherein the order of decoding the first DCI and the second DCI is based at least in part on an order of a candidate index of the first DCI and a candidate index of the second DCI.

21. The method of claim 15, wherein transmitting the first PDSCH and transmitting the second PDSCH includes transmitting the first PDSCH and the second PDSCH in an order that is based at least in part on an order of a starting symbol index of the first PDSCH and a starting symbol index of the second PDSCH.

22. The method of claim 15, wherein transmitting the first PDSCH and transmitting the second PDSCH includes transmitting the first PDSCH and the second PDSCH in an order that is based at least in part on an order of an ending symbol index of the first PDSCH and an ending symbol index of the second PDSCH.

23. The method of claim 15, wherein the order of decoding the first DCI and the second DCI is based at least in part on an order of a candidate ordering index of the first PDSCH and a candidate ordering index of the second PDSCH.

24. The method of claim 15, wherein transmitting the first DCI, the first PDSCH, the second DCI, and the second PDSCH includes transmitting the first DCI, the first PDSCH, the second DCI, and the second PDSCH based at least in part on a type of the UE.

25. The method of claim 15, wherein transmitting the first DCI, the first PDSCH, the second DCI, and the second PDSCH includes transmitting the first DCI, the first PDSCH, the second DCI, and the second PDSCH based at least in part on a capability of the UE.

26. A method of wireless communication performed by a user equipment (UE), comprising:
- determining that an end of a first downlink control information (DCI) and an end of a second DCI are expected to be received at different symbols;
- decoding the first DCI and the second DCI in an order that is based at least in part on one or more properties of the first DCI, one or more properties of the second DCI, or a combination thereof;
- receiving a first physical downlink shared channel (PDSCH) based at least in part on when the UE decodes the first DCI; and
- receiving a second PDSCH based at least in part on when the UE decodes the second DCI.

27. The method of claim 26, wherein determining that the end of the first DCI and the end of the second DCI are expected to be received at different symbols includes determining, after determining that the first DCI and the second DCI end at a same symbol, that the second PDSCH will not be scheduled to be received.

28. The method of claim 26, wherein determining that the end of the first DCI and the end of the second DCI are expected to be received at different symbols includes determining that the end of the first DCI and the end of the second DCI are expected to be received at different symbols based at least in part on a type of the UE.

29. The method of claim 26, further comprising transmitting an indication of a type of the UE, or a capability of the UE for receiving the end of the first DCI and the end of the second DCI at different symbols or at the same symbol.

30. The method of claim 26, further comprising expecting to receive the end of the first DCI and the end of the second DCI at different symbols, prior to transmitting a capability of the UE for receiving the end of the first DCI and the end of the second DCI at different symbols or at the same symbol.

* * * * *